(12) United States Patent  
Yamashita et al.

(10) Patent No.: US 7,736,045 B2  
(45) Date of Patent: Jun. 15, 2010

(54) AREA LIGHT SOURCE AND LIGHTGUIDE USED THEREFORE

(75) Inventors: Tomoyoshi Yamashita, Kanagawa (JP); Yasuko Hayashi, Kanagawa (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 12/081,199

(22) Filed: Apr. 11, 2008

(65) Prior Publication Data

US 2008/0232136 A1 Sep. 25, 2008

Related U.S. Application Data

(62) Division of application No. 10/491,635, filed as application No. PCT/JP02/10369 on Oct. 4, 2002, now abandoned.

(30) Foreign Application Priority Data

Oct. 4, 2001 (JP) .............................. 2001-309134  
Oct. 23, 2001 (JP) .............................. 2001-325204

(51) Int. Cl.  
*F21V 7/04* (2006.01)

(52) U.S. Cl. .................. 362/615; 362/620; 362/626

(58) Field of Classification Search ................ 362/606, 362/607, 610, 615, 618, 619, 620, 623, 626  
See application file for complete search history.

(56) References Cited

U.S. PATENT DOCUMENTS

| | | |
|---|---|---|
| 5,718,497 A | 2/1998 | Yokoyama et al. |
| 5,914,825 A | 6/1999 | Nishio et al. |
| 5,980,054 A | 11/1999 | Fukui et al. |
| 6,467,922 B1 | 10/2002 | Blanc et al. |
| 6,502,947 B2 * | 1/2003 | Matsumoto et al. ......... 362/626 |

FOREIGN PATENT DOCUMENTS

| | | | |
|---|---|---|---|
| JP | 7-30401 | U | 6/1995 |
| JP | 7-270624 | A | 10/1995 |
| JP | 09-133918 | A | 5/1997 |
| JP | 09-145932 | A | 6/1997 |
| JP | 09-211227 | A | 8/1997 |
| JP | 9-329714 | | 12/1997 |
| JP | 09-329714 | A | 12/1997 |

(Continued)

*Primary Examiner*—Gunyoung T Lee  
(74) *Attorney, Agent, or Firm*—Morgan, Lewis & Bockius LLP

(57) ABSTRACT

A plate-shaped light guide for a planar light source device that guides a light emitted from a primary light source includes a light incident end face, a light emitting face and a back surface on the opposite to the light emitting face, wherein a plurality of first elongated lenses having an average slant angle of 0.5 to 60° are continuously or intermittently formed on one of the light emitting face and the back surface, and at least a portion of a surface of each first elongated lens, or at least a portion of the other one of the light emitting face and the back surface, or at least the portion of the surface of each first elongated lens and at least the portion of the other one of the light emitting face and the back surface includes a rough surface having an average slant angle of 0.1 to 8°.

18 Claims, 13 Drawing Sheets

FOREIGN PATENT DOCUMENTS

| | | |
|---|---|---|
| JP | 10-020121 A | 1/1998 |
| JP | 10-153778 A | 6/1998 |
| JP | 10-30110 A | 11/1998 |
| JP | 10-319216 | 12/1998 |
| JP | 11-265612 | 9/1999 |
| JP | 2000-098382 A | 4/2000 |
| JP | 2001-035222 | 2/2001 |
| JP | 2001-035222 A | 2/2001 |
| JP | 2001-124909 | 5/2001 |
| JP | 2001-194517 | 7/2001 |

* cited by examiner

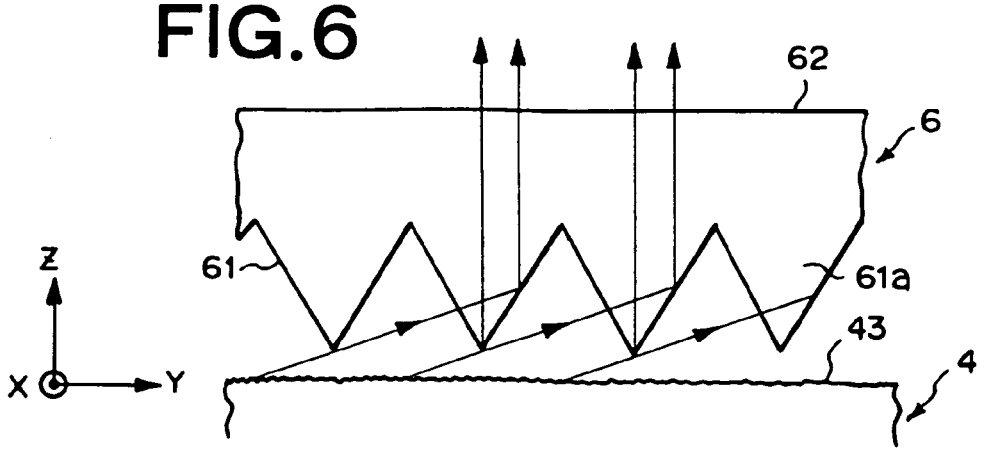
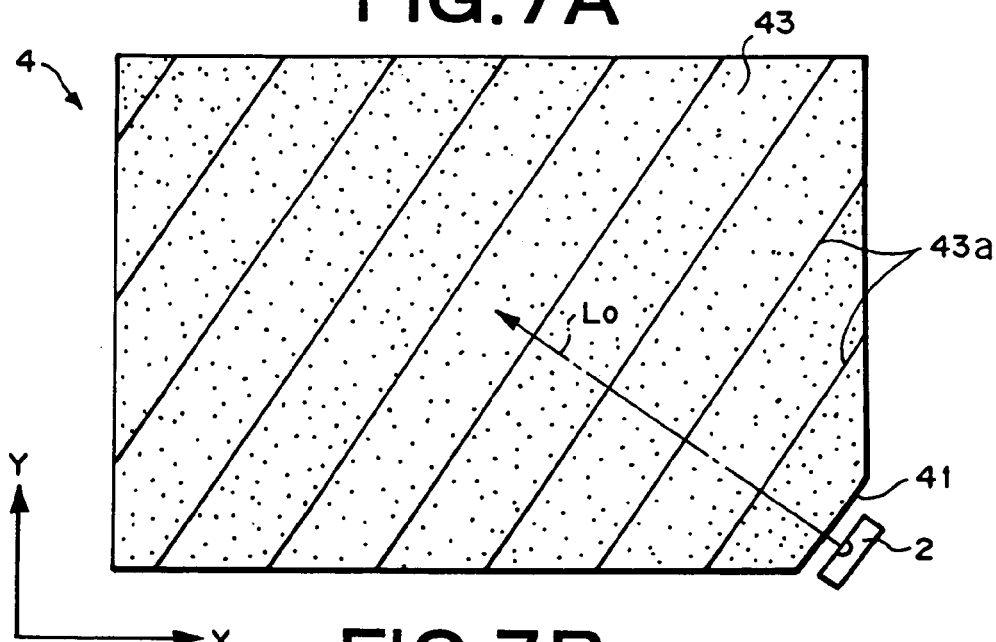
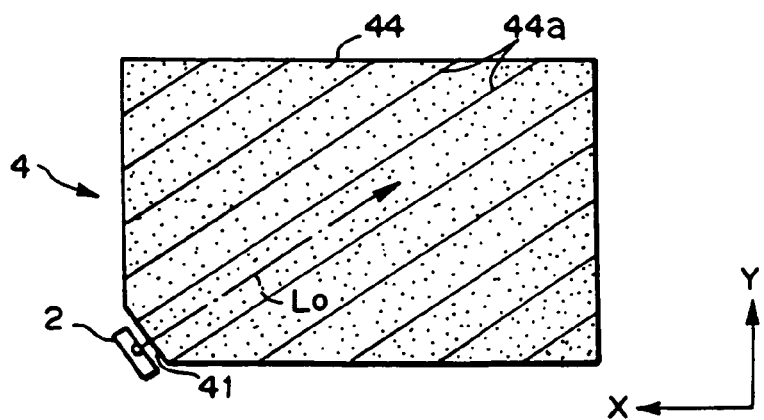

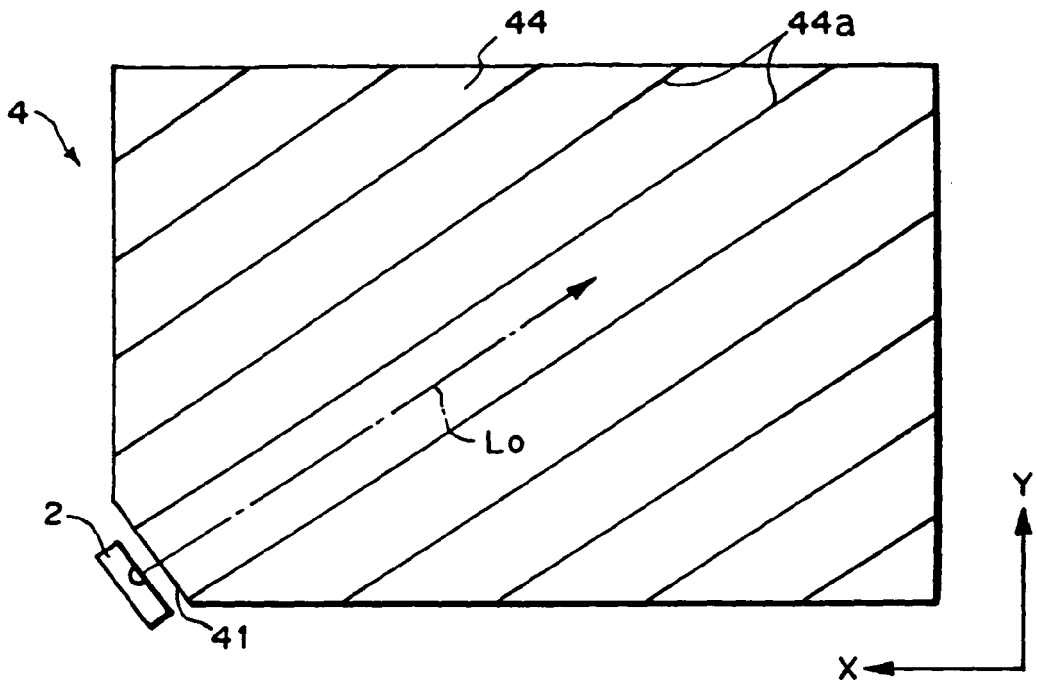
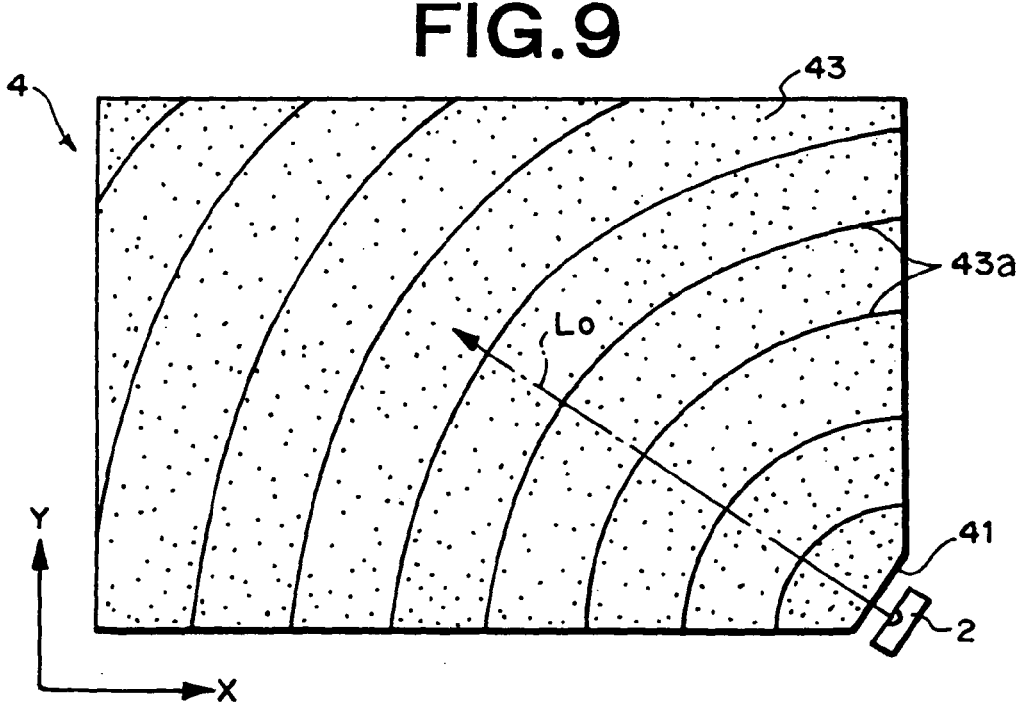

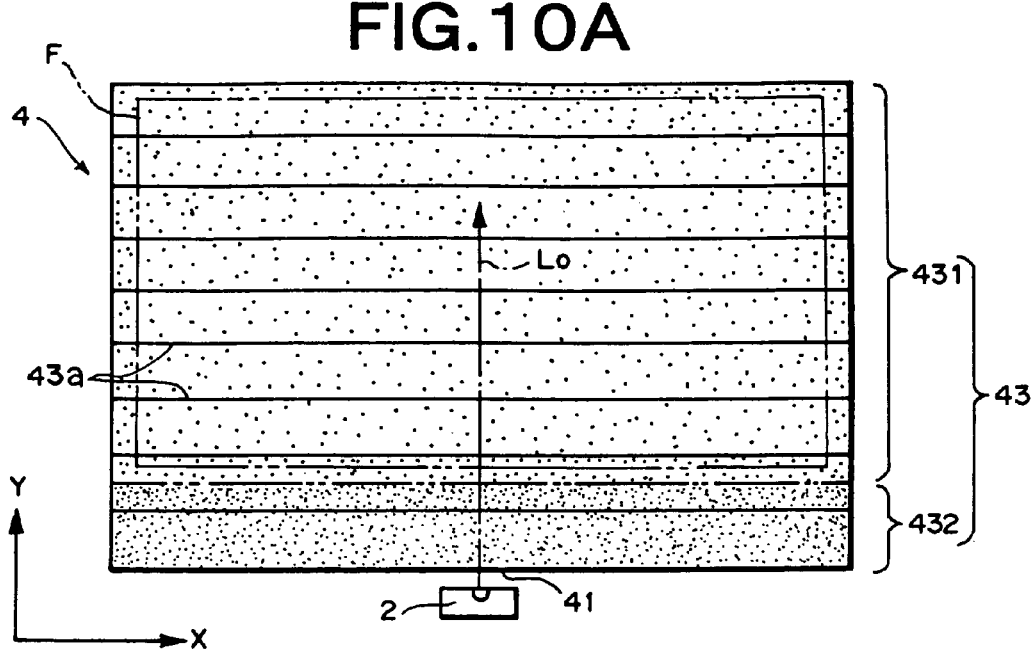
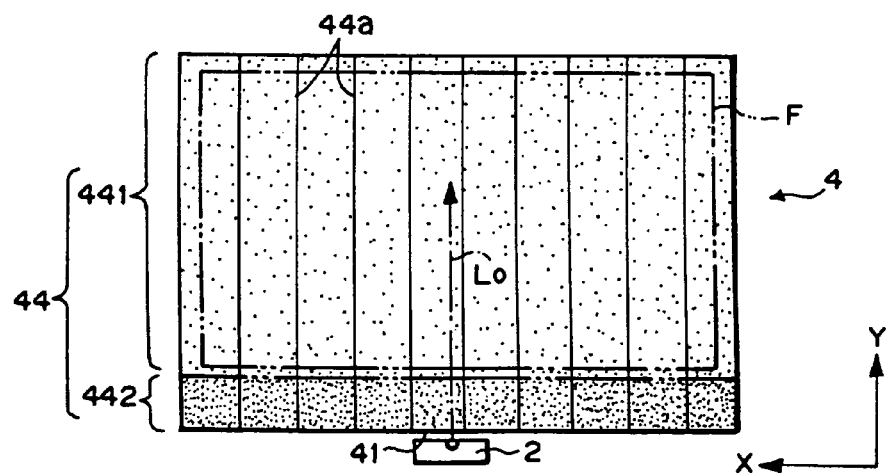

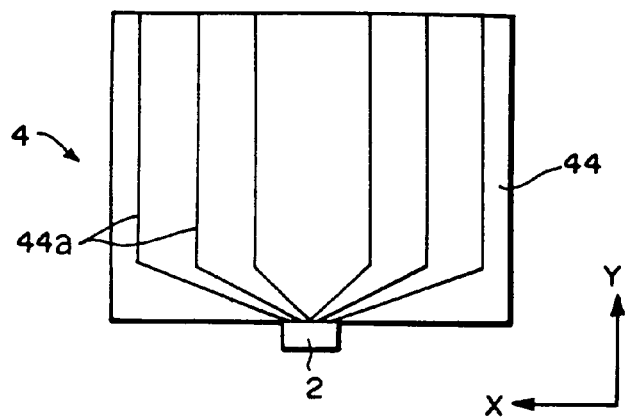
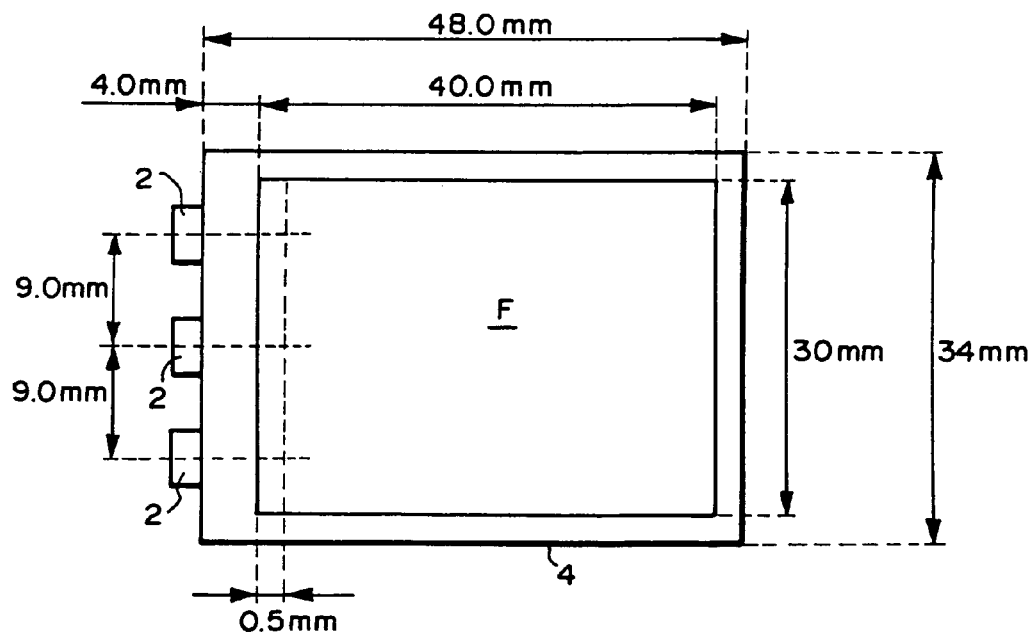

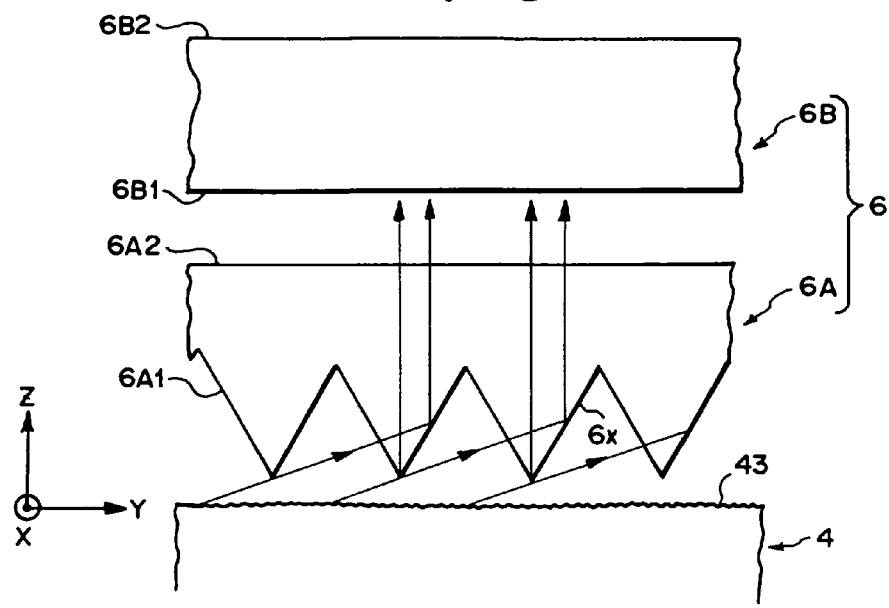
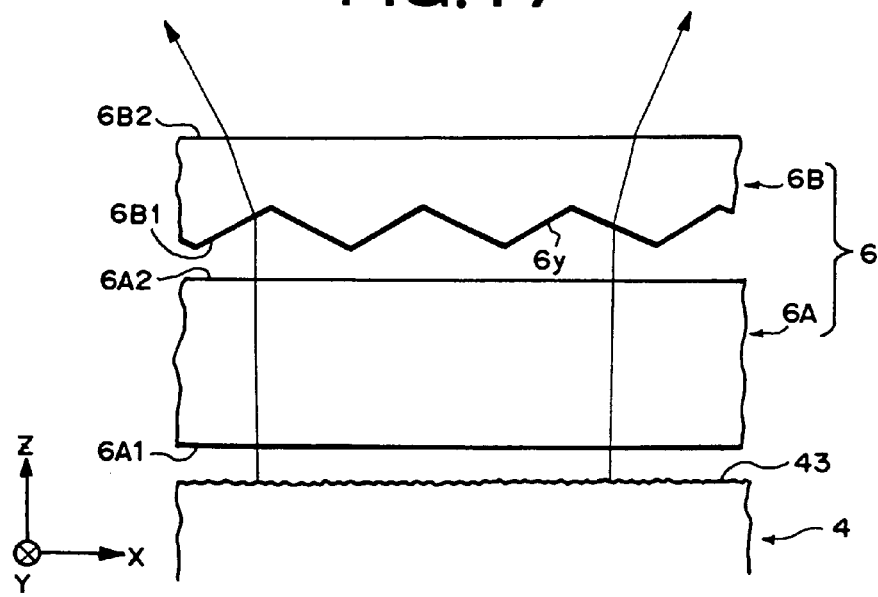

RELATIVE LIGHT INTENSITY

ANGLE

EFFECTIVE LIGHT EMISSION REGION

LIGHT GUIDE

BRIGHT PART

DARK PART

LIGHT FROM LED

LED

AREA LIGHT SOURCE AND LIGHTGUIDE USED THEREFORE

This is a Divisional of application Ser. No. 10/491,635 filed on Apr. 2, 2004 now abandoned, which is a U.S. National Stage Entry of PCT/JP02/10369 filed on Oct. 4, 2002, and claims benefit of Japanese Patent Applications No. 2001-325204 and 2001-309134, filed Oct. 23, 2001 and Oct. 4, 2001, respectively.

BACKGROUND OF THE INVENTION

1. Field of the Invention

The present invention relates to a planar light source device of an edge light system, and more particularly to a planar light source device which uses a point light source such as a light emitting diode (LED) designed to realize miniaturization and a reduction in power consumption. The planar light source device of the present invention is suitably applied to a backlight of a relatively compact liquid crystal display device used as a display panel of a portable electronic device such as a cellular phone, or an indicator of various devices.

2. Background of the Related Art

Recently, the liquid crystal display device has been in wide use as a monitor for a portable notebook personal computer or the like, or a display section for a liquid crystal television, a video integrated liquid crystal television or the like, and in various other fields. The liquid crystal display device basically comprises a backlight section and a liquid crystal display element section. As the backlight section, a type of an edge light system has frequently been used with a view to making the liquid crystal display device compact. Conventionally, as a backlight, a type has been in wide use in which at least one end face of a rectangular platelike light guide is used as a light incident end face, a linear or bar-shaped primary light source such as a straight tube fluorescent lamp is arranged along the light incident end face, a light emitted from the primary light source is entered into the light guide through the light incident end face thereof, and the light is emitted from a light emitting face which is one of two principal surfaces of the light guide.

Meanwhile, there has recently been made a demand for miniaturization and a reduction in power consumption regarding liquid crystal display devices of relatively small screen sizes such as portable electronic devices, e.g., cellular phone, personal digital assistants, portable game machines, etc., or indicators of various electric devices or electronic devices. Thus, an LED that is a point light source is used as a primary light source of the backlight in order to reduce power consumption. As the backlight that uses the LED as the primary light source, an example is described in JP(A)-7-270624 in which a plurality of LED's are one-dimensionally arrayed along a light incident end face of a light guide in order to exhibit a function similar to that of the backlight which uses the linear primary light source. The use of the primary light source based on the one-dimensional arrangement of the plurality of LED's enables acquisition of a required light amount and uniformity of a luminance distribution on an entire screen.

However, in the case of the compact liquid crystal display device, a further reduction is demanded in power consumption. In order to meet this demand, it is necessary to reduce the number of LED's to be used. However, a reduction in the number of LED's brings about lowering of luminance and non-uniformity of a luminance distribution.

JP(A)-9-133918 and JP(A)-10-20121 propose a planar light source device to achieve low power consumption without lowering luminance as much as possible. In the device, a rough surface or a lens surface is formed, on which a number of elongated lenses such as elongated prisms are formed in parallel with an incident end face as a light emitting mechanism on a light emitting face or a back surface of a light guide, and a prism sheet having a number of elongated prisms is arranged on the light emitting face of the light guide so as to set the prism surface of the prism sheet on the light guide side. According to the device, power consumption of the backlight is reduced and a distribution of an emitted light is narrowed to prevent lowering of luminance as much as possible.

In the case of applying such a light emitting structure to the planar light source device that uses the point light source, the device in which the rough surface is formed as the light emitting structure can emit a highly directive light of a narrower emitted light distribution in a plane (perpendicular direction) perpendicular to both of the light incident end face and the light emitting face of the light guide, but cannot sufficiently prevent a reduction of luminance because of a very wide emitted light distribution in a plane (parallel direction) parallel to the light incident end face of the light guide and perpendicular to the light emitting face. On the other hand, the device in which the lens surface is formed as the light emitting structure can emit a highly directive light of a narrower emitted light distribution in both of parallel and perpendicular directions to achieve high luminance, but has a problem of an extremely narrow distribution range of an emitted light, i.e., several to several tens of degrees, in a plane parallel to the light emitting face. Additionally, since the reduced number of LED's increases a distance between light emitting points, a region of the light guide close to a region between adjacent light emitting points is expanded to lower intensity of a light emitted therefrom in a required direction. This condition has a problem of bringing about non-uniformity (i.e., non-uniformity of uniformity degree of luminance) of a luminance distribution in an observation direction on a light emitting surface of the planar light source device.

An object of the present invention is to provide a high-quality planar light source device by solving, without deteriorating an emitted light distribution, the aforementioned problems of a reduction of luminance and non-uniformity of luminance distribution brought about by the use of a small number of primary light sources in a point state to achieve low power consumption of the planar light source device that uses the primary light source in the point state.

SUMMARY OF THE INVENTION

According to the present invention, in order to achieve the above object, there is provided a plate-like light guide for planar light source device which guides a light emitted from a primary light source in a point state, and has a light incident end face on which the light emitted from the primary light source is incident and a light emitting face through which the guided light is emitted, characterized in that on one of the light emitting face and a back surface on the opposite side thereto, a plurality of elongated lenses having an average slant angle of 0.5 to 60° are continuously or intermittently formed, and a rough surface of an average slant angle of 0.1 to 8° is formed on at least a part of a surface of each of the elongated lenses and/or at least a part of a surface on the opposite side to the surface on which the elongated lenses are formed.

In an aspect of the present invention, each of the elongated lenses extends in a direction substantially orthogonal to a direction of a directivity of the light emitted from the primary light source and entered into the light guide in a plane along the light emitting face. In an aspect of the present invention, each of the elongated lenses extends in a direction substantially orthogonal to a propagation direction of the light emitted from the primary light source and entered into the light guide in the plane along the light emitting face. In an aspect of the present invention, an average slant angle of the elongated lenses is in a range of 0.5 to 25°.

In an aspect of the present invention, on the surface on the opposite side to the surface on which the elongated lenses are formed, a plurality of elongated lenses are formed to extend substantially along the direction of the directivity of the light emitted from the primary light source and entered into the light guide in the plane along the light emitting face. In an aspect of the present invention, on the surface on the opposite side to the surface on which the elongated lenses are formed, a plurality of elongated lenses are formed to extend substantially along the propagation direction of the light emitted from the primary light source entered into the light guide in the plane along the light emitting face. In an aspect of the present invention, each of the elongated lenses extending substantially along the direction of the directivity of the light entered into the light guide is an elongated prism or an elongated lenticular lens. In an aspect of the present invention, the average slant angle of the elongated lenses extending substantially along the direction of the directivity of the light entered into the light guide is in a range of 8 to 60°.

In an aspect of the present invention, each of the elongated lenses extends substantially along the direction of the directivity of the light emitted from the primary light source and entered into the light guide in the plane along the light emitting face. In an aspect of the present invention, each of the elongated lenses extends substantially along the propagation direction of the light emitted from the primary light source and entered into the light guide in the plane along the light emitting face.

In an aspect of the present invention, the average slant angle of the rough surface is in a range of 0.5 to 6°. In an aspect of the present invention, each of the elongated lenses is an elongated prism or an elongated lenticular lens.

In an aspect of the present invention, the average slant angle of the elongated lenses is in a range of 8 to 60°. In an aspect of the present invention, a flat part is formed in a valley between adjacent elongated lenses. In an aspect of the present invention, a pitch of the elongated lenses is changed according to a distance from the primary light source.

In an aspect of the present invention, the average slant angle of the rough surface varies from place to place. In an aspect of the present invention, the average slant angle of the rough surface is larger in a second region near the light incident end face than that in a first region which is the other region. In an aspect of the present invention, the average slant angle of the rough surface in the second region is in a range of 2 to 8°. In an aspect of the present invention, the average slant angle of the rough surface in the first region is in a range of 0.5 to 4°.

In an aspect of the present invention, the rough surface is formed on both of the surface of the elongated lenses and the surface on the opposite side to the surface on which the elongated lenses are formed, the average slant angle of the rough surface varies from place to place, and the average slant angle of the rough surface on the surface of the elongated lenses is smaller in a region in which the average slant angle of the rough surface of the surface on the opposite side to the surface on which the elongated lenses are formed is larger.

According to the present invention, in order to achieve the above object, there is provided a planar light source device characterized by comprising: the light guide described in the above; the primary light source arranged adjacently to the light incident end face of the light guide; and a light deflecting device arranged adjacently to the light emitting face of the light guide, wherein the light deflecting device has a light entering surface positioned so as to confront the light emitting face of the light guide and a light going-out surface on the opposite side to the light entering surface, and a plurality of elongated lenses are disposed on the light entering surface.

In an aspect of the present invention, each of the plurality of elongated lenses of the light deflecting device extends in a direction substantially orthogonal to the direction of the directivity of the light emitted from the primary light source and entered into the light guide in the plane along the light emitting face. In an aspect of the present invention, each of the plurality of elongated lenses of the light deflecting device extends in a direction substantially orthogonal to the propagation direction of the light emitted from the primary light source and entered into the light guide in the plane along the light emitting face. In an aspect of the present invention, each of the plurality of elongated lenses of the light deflecting device is an elongated prism, and at least one of prism surfaces that form the elongated prism is a convex curved surface.

In an aspect of the present invention, the light deflecting device includes at least one light deflection sheet, the light deflection sheet has a light entering surface through which a light based on the emitted light from the light emitting face of the light guide is entered into the light deflection sheet and a light going-out surface on the opposite side to the light entering surface, a plurality of elongated lenses are formed on a light entering surface of a first light deflection sheet among the at least one light deflection sheet positioned closest to the light guide so as to extend in a direction substantially parallel to the light incident end face, each of the elongated lenses of the first light deflection sheet forms a substantially triangular sectional shape of an apex angle of 50 to 80°, a plurality of linear structures each having concave or convex cross-section are formed on a light going-out surface of the first light deflection sheet, or a light entering surface or a light going-out surface of the other light deflection sheet so as to extend in a direction substantially orthogonal to the light incident end face, and an average slant angle of the surface on which the linear structures are formed is in a range of 5 to 40°.

In an aspect of the present invention, each of the linear structures comprises an elongated lens. In an aspect of the present invention, each of the linear structures is formed by hairline processing of 0.1 to 200 μm in height. In an aspect of the present invention, the light deflecting device includes the first light deflection sheet and the other second light deflection sheet, and the linear structures are formed on a light entering surface of the second light deflection sheet.

In an aspect of the present invention, the light deflecting device includes the first light deflection sheet and the other second light deflection sheet, and the linear structures are formed on a light going-out surface of the second light deflection sheet. In an aspect of the present invention, adhesion prevention means is disposed to prevent adhesion between the first light deflection sheet and the second light deflection sheet. In an aspect of the present invention, the adhesion prevention means is a spacer which forms a gap between the first light deflection sheet and the second light deflection sheet. In an aspect of the present invention, the adhesion prevention means is a light diffusion sheet arranged between the first light deflection sheet and the second light deflection sheet.

In an aspect of the present invention, the light deflecting device is constituted of the first light deflection sheet, and the linear structures are formed on the light going-out surface of the first light deflection sheet. In an aspect of the present invention, the primary light source is an LED or an aggregate of LED's.

According to the present invention, in order to achieve the above object, there is provided a planar light source device characterized by comprising: a primary light source in a point state; a plate-like light guide arranged adjacently to the primary light source to guide a light emitted from the primary light source and having a light incident end face on which the light emitted from the primary light source is incident and a light emitting face through which the guided light is emitted; and a light deflecting device arranged adjacently to the light emitting face of the light guide, wherein the light deflecting device includes at least one light deflection sheet, the light deflection sheet has a light entering surface through which a light based on the emitted light from the light emitting face of the light guide is entered into the light deflection sheet and a light going-out surface on the opposite side to the light entering surface, a plurality of elongated lenses are formed on a light entering surface of a first light deflection sheet among the at least one light deflection sheet positioned closest to the light guide so as to extend in a direction substantially parallel to the light incident end face, each of the elongated lenses of the first light deflection sheet forms a substantially triangular sectional shape of an apex angle of 50 to 80°, a plurality of linear structures each having concave or convex cross-section are formed on a light going-out surface of the first light deflection sheet, or a light entering surface or a light going-out surface of the other light deflection sheet so as to extend in a direction substantially orthogonal to the light incident end face, and an average slant angle of the surface on which the linear structures are formed is in a range of 5 to 40°.

In an aspect of the present invention, each of the linear structures comprises an elongated lens. In an aspect of the present invention, each of the linear structures is formed by hairline processing of 0.1 to 200 μm in height. In an aspect of the present invention, the light deflecting device includes the first light deflection sheet and the other second light deflection sheet, and the linear structures are formed on a light entering surface of the second light deflection sheet. In an aspect of the present invention, the light deflecting device includes the first light deflection sheet and the other second light deflection sheet, and the linear structures are formed on a light going-out surface of the second light deflection sheet. In an aspect of the present invention, adhesion prevention means is disposed to prevent adhesion between the first light deflection sheet and the second light deflection sheet. In an aspect of the present invention, the adhesion prevention means is a spacer which forms a gap between the first light deflection sheet and the second light deflection sheet. In an aspect of the present invention, the adhesion prevention means is a light diffusion sheet arranged between the first light deflection sheet and the second light deflection sheet. In an aspect of the present invention, the light deflecting device is constituted of the first light deflection sheet, and the linear structures are formed on the light going-out surface of the first light deflection sheet.

BRIEF DESCRIPTION OF THE DRAWINGS

FIG. 6 is a view showing a state of light deflection by a light deflecting device;

FIG. 7A is a plan view showing the light guide of the invention together with the primary light source;

FIG. 7B is a bottom view showing the light guide of the invention together with the primary light source;

FIG. 8 is a bottom view showing the light guide of the invention together with the primary light source;

FIG. 9 is a plan view showing the light guide of the invention together with the primary light source;

FIG. 10A is a plan view showing the light guide of the invention together with the primary light source;

FIG. 10B is a bottom view showing the light guide of the invention together with the primary light source;

FIG. 11 is a bottom view showing the light guide of the invention together with the primary light source;

FIG. 12 is a schematic view showing a size of a planar light source device used in an Example;

FIG. 16 is a view showing a state of light deflection by the light deflecting device;

FIG. 17 is a view showing a state of light deflection by the light deflecting device;

DETAILED DESCRIPTION OF THE PREFERRED EMBODIMENTS

Reference will now be made in detail to the preferred embodiments of the present invention, examples of which are illustrated in the accompanying drawings.

Figure 1A:
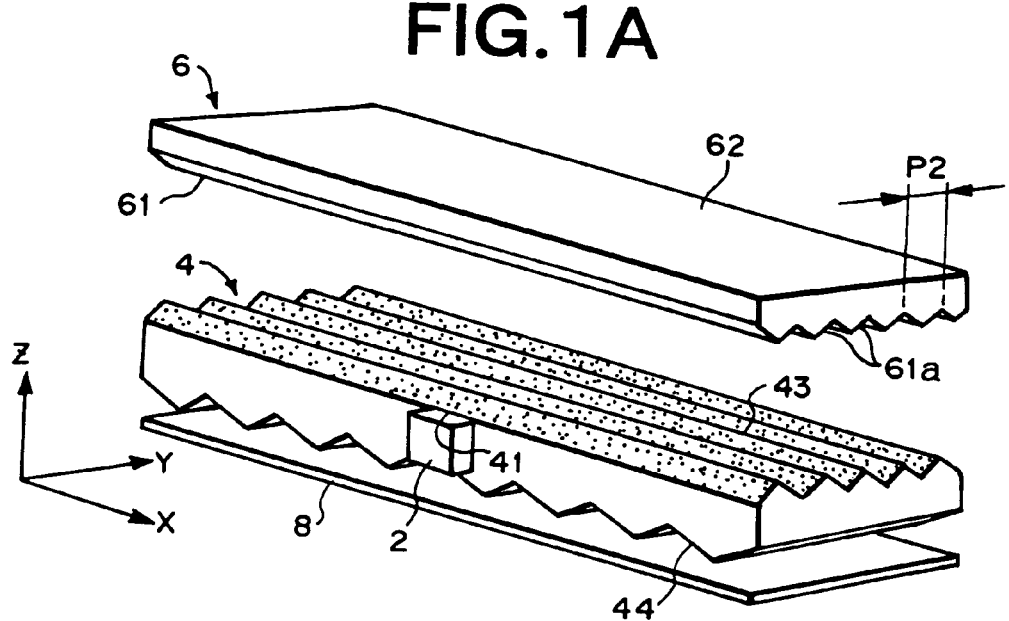
FIGS. 1A and 1B are exploded perspective views showing a planar light source device of the present invention.
Figure 1B:
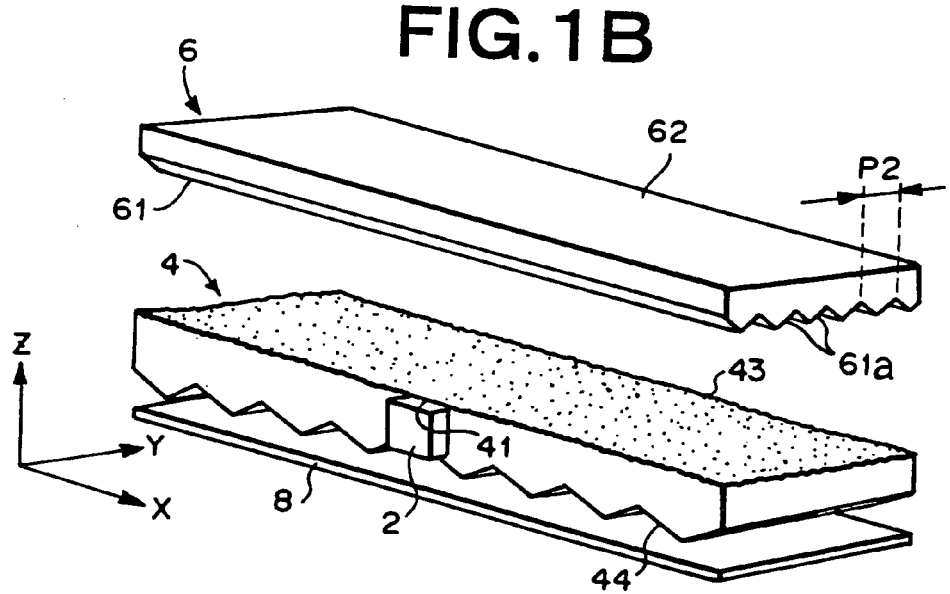

FIGS. 1A and 1B are exploded perspective views showing an embodiment of a planar light source device or area light source according to the present invention. As shown in FIGS. 1A and 1B, the planar light source device of the embodiment comprises an LED 2 as a primary light source in a point state, a rectangular plate-like light guide 4 in an XY plane which makes a light emitted from the LED incident on a light incident end face, and guides the light to be emitted from a light emitting face, and a light deflecting device or light deflecting element 6 and a light reflecting device or light reflecting element 8 arranged adjacently to the light guide. The light guide 4 has two upper and lower principal surfaces, and four edges for joining outer peripheries of the principal surfaces.

The LED 2 is adjacent to one edge (edge on front side of FIGS. 1A and 1B: incident edge) of a pair of edges of the light guide 4 substantially parallel to each other, and arranged on a center of the edge in an X direction. According to the invention, the number of point light sources such as LED's which are primary light sources should preferably be set as small as possible with a view to achieving low power consumption. However, depending on a size or the like of the light guide 4, a plurality of LED's can be arranged close to one another to form an aggregate, alternatively a plurality of LED's or LED aggregates may be arranged at fixed intervals.

On the incident edge of the light guide 4, a light incident end face 41 is formed corresponding to a position in which the LED 2 is arranged. The light incident end face 41 formed in the light guide 4 may be formed by notching the incident edge in a concave shape to form a concave cylindrical surface shape or the like. Preferably, an LED light emitting face and the light incident end face should be formed in opposing concave and convex shapes to fit each other (including a case in which both are planar).

In the light guide 4, one principal surface (upper surface in the drawing) is set as a light emitting face or light emerging face 43. On at least one of the light emitting face 43 and a back surface or back 44 on its opposite side, a directive light emitting structure is formed to emit a light guided in the light guide 4 in a direction slanted with respect to the light emitting face 43 (i.e., direction slanted with respect to the XY plane). According to the present invention, as the directive light emitting structure, a structure is used in which a rough surface or coarse surface (mat surface) or a number of elongated lenses or lens arrays (referred to as transversely elongated lenses, hereinafter) such as elongated prisms or prism arrays, elongated lenticular lenses or V-shaped grooves are continuously or intermittently formed to extend in a direction substantially orthogonal to a direction of a directivity of a light emitted from the LED 2 and entered into the light guide 4.

Figure 2A:
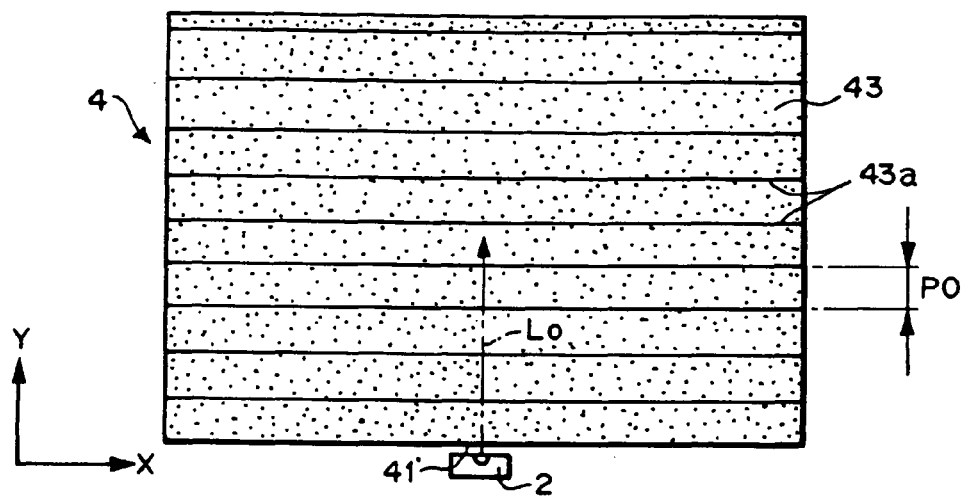
FIG. 2A is a plan view showing a light guide of the invention together with a primary light source.

According to the embodiment shown in FIG. 1A, as shown in FIG. 2A, the light emitting face 43 has a number of elongated prisms 43a (ridgeline of each elongated prism 43a is shown in FIG. 2A) as the transversely elongated lenses continuously arrayed in parallel with one another to extend in a direction substantially orthogonal to a direction (direction of a light $L_0$ of maximum intensity in a light intensity distribution) of the directivity of the light emitted from the LED 2 and entered into the light guide 4. For example, if a direction of the directivity of the light entered into the light guide 4 is substantially in a Y direction, as shown in FIG. 2A, the direction of the elongated prisms 43a can be set in an X direction.

Incidentally, according to the present invention, the direction of the transversely elongated lenses such as the elongated prisms 43a may be shifted from a direction orthogonal to the direction of the directivity of the light entered into the light guide 4 within a range of not greatly damaging a light emitting function. In this case, the direction of the elongated prisms 43a is preferably set in a range of 20° or less with respect to the direction orthogonal to the direction of the directivity of the light entered into the light guide 4, more preferably in a range of 10° or less. Additionally, as shown in FIG. 9 (described later), the transversely elongated lenses may extend in a direction substantially orthogonal to a propagation direction of the light emitted from the primary light source 2 and entered into the light guide 4 in a plane along the light emitting face of the light guide 4, and in a bent shape to surround the primary light source.

According to the present invention, for the transversely elongated lenses such as the elongated prisms 43a formed in the light guide 4 as the directive light emitting structure, an average slant angle or average angle of inclination defined in accordance with ISO 4287/1-1984 is preferably set in a range of 0.5 to 25°, more preferably in a range of 0.5 to 20°, further preferably in a range of 1 to 10°, in a direction orthogonal to the extending direction of the transversely elongated lenses. It is because such a range of the average slant angle of the transversely elongated lenses enables emission of a highly directive light of a narrow emitted light distribution in a YZ plane. An arraying pitch P0 of the transversely elongated lenses is preferably set in a range of 10 to 200 μm, more preferably in a range of 20 to 100 μm, further preferably in a range of 20 to 80 μm. Incidentally, in the case of using the elongated prisms 43a as the transversely elongated lenses, shapes substantially isosceles triangular in section are preferred. However, the shapes are not limited to such, and elongated prisms in which tops of triangles are curved or planar, or prism surfaces are convex or concave may be used.

Additionally, for the transversely elongated lenses formed in the light guide 4, it is possible to increase a uniformity ratio of luminance on the entire light emitting face by partially or continuously changing pitches thereof within the aforementioned range. It is normally preferable to gradually reduce pitches as the distance from the primary light source in the point state increases. Depending on cases, the pitches may be gradually reduced and then gradually increased, as the distance from the primary light source in the point state increases. Further, a flat part can be formed in a valley between adjacent transversely elongated lenses to control the amount of an emitted light. In this case, it is normally preferable to set a maximum emission amount in the center of the light emitting face and therefore an area ratio of the formed flat part can be made smaller toward the center.

Figure 2B:
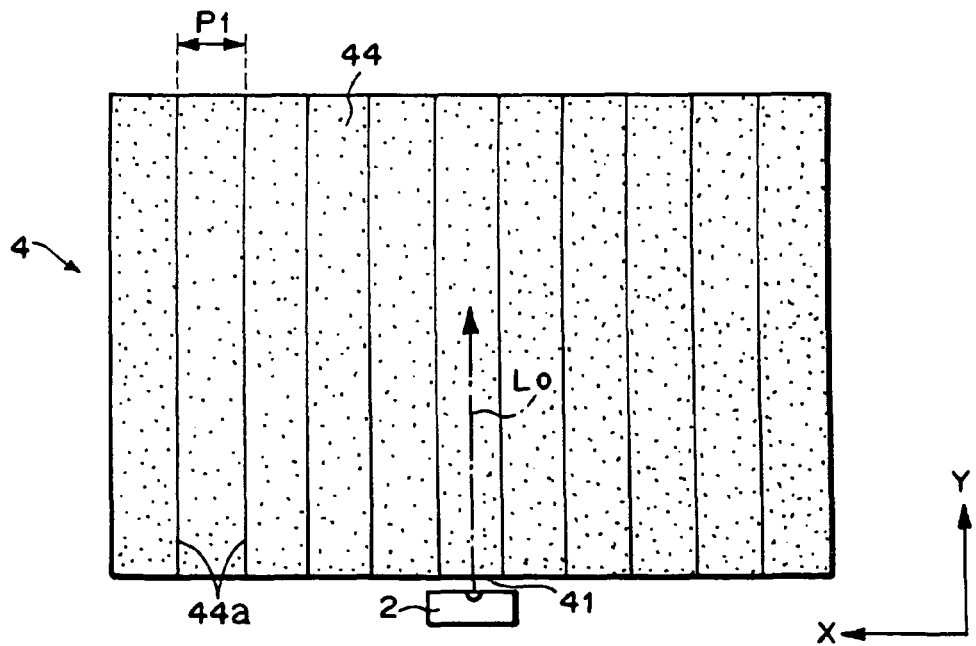
FIG. 2B is a bottom view showing the light guide of the invention together with the primary light source.
Figure 5:
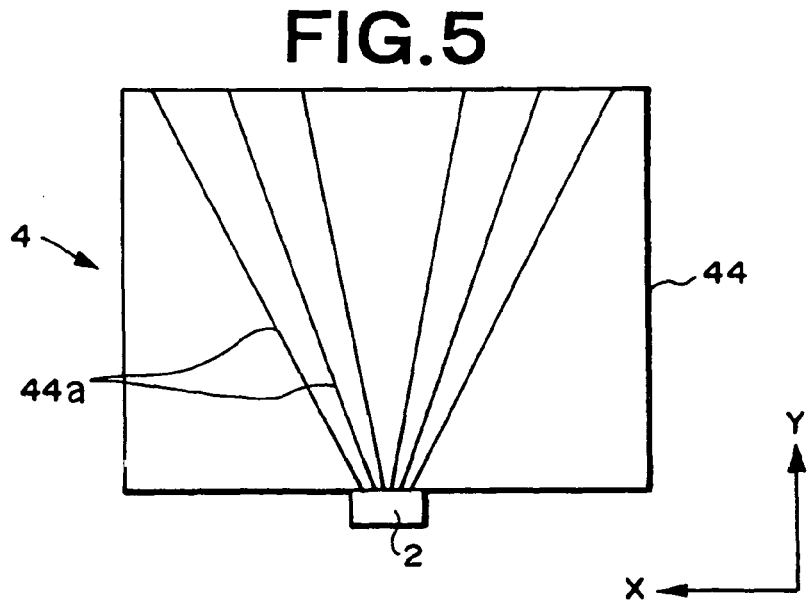
FIG. 5 is a bottom view showing the light guide of the invention together with the primary light source.

According to the embodiment shown in FIG. 1B, a rough surface (mat surface) is formed as a directive light emitting structure on the light emitting face 43. As shown in FIG. 2B, the other principal surface 44 (bottom surface in the drawings) has a number of elongated prisms 44a (ridgeline of each elongated prism 44a is shown in FIG. 2B) arrayed in parallel with one another to extend substantially along a direction (direction of a light 4 of maximum intensity in a light intensity distribution) of a directivity of a light emitted from the LED 2 and entered into the light guide 4. For example, if a direction of the directivity of the light entered into the light guide 4 is substantially in a Y direction, as shown in FIG. 2B, a direction of the elongated prisms 44a can be set in a Y direction. Incidentally, according to the present invention, the direction of the elongated prisms 44a may be shifted from the direction of the directivity of the light entered into the light guide 2 within a range of not greatly damaging an effect of expanding the light. In this case, the direction of the elongated prisms 44a is preferably set in a range of 20° or less with respect to the direction of the directivity of the light entered into the light guide, more preferably in a range of 10° or less. Additionally, as shown in FIG. 5, the elongated prisms 44a may be formed into radial shapes so that a direction thereof can be substantially along a propagation direction of the light entered into the light guide 4. In this case, as shown in FIG. 11, the direction of the elongated prisms 44a may be locally changed from the direction of the directivity of the light entered into the light guide 4 especially in a region close to an edge on the light incident end face 41 side. In this case, an area of the region in which the direction is changed is preferably set to 30% or less of a total. The formation of the elongated prisms 44a in such a direction expands the light entered into the light guide 4 in the XY plane, thereby making it difficult to form dark parts.

An arraying pitch P1 of the elongated prisms 44a is preferably set in a range of 10 to 100 μm, more preferably in a range of 10 to 80 μm, further preferably in a range of 20 to 70 μm. Incidentally, according to the present invention, the pitches of the elongated prisms 44a may be equal among all the elongated prisms 44a, partially different, or gradually changed within the aforementioned range.

Additionally, apex angles θ of the elongated prisms 44a are preferably set in a range of 60 to 164°. It is because such a range of the apex angles enables expansion of a distribution of the light entered into the light guide 4, and improvement in uniformity of a luminance distribution of the emitted light from the light guide 4. The apex angles θ are more preferably set in a range of 80 to 156°, further preferably in a range of 110 to 150°. The elongated prisms 44a are not limited to shapes substantially triangular in section. The elongated prisms in which tops of triangles are curved or planar, or prism surfaces are convex or concave may be used.

According to the present invention, the elongated lenses (referred to as longitudinally elongated lenses, hereinafter) which is formed on the light guide 4 so as to extend in the direction substantially along the direction of the directivity of the light emitted from the LED 2 and entered into the light guide 4 are not limited to the elongated prisms. Other longitudinally elongated lenses such as lenticular lenses may be used. In this case, an average slant angle defined in accordance with ISO 4287/1-1984 is preferably set in a range of 8 to 60°, more preferably in a range of 12 to 50°, further preferably in a range of 15 to 35°, in a direction orthogonal to the extending direction of the elongated lenses. It is because such a range of the average slant angle of the elongated lenses enables efficient expansion of the light entered into the light guide 4 in the XY plane.

According to the present invention, for the rough surface formed as the directive light emitting structure in the light guide 4, an average slant angle defined in accordance with ISO 4287/1-1984 is preferably set in a range of 0.5 to 25°, more preferably in a range of 0.5 to 20°, further preferably in a range of 1 to 10°. It is because such a range of the average slant angle of the rough surface enables emission of a highly directive light of a narrow emitted light distribution in the YZ plane.

According to the present invention, the directive light emitting structure emits a directive light in a distribution in the YZ plane which includes both of a normal direction (Z direction) of the light emitting face 43 and a Y direction orthogonal to the incident edge. An angle formed between a peak direction of the emitted light distribution and the light emitting face 43 is preferably set in a range of 10 to 40°, and a half-value width of the emitted light distribution is preferably set in a range of 10 to 40°, more preferably in a range of 10 to 30°, further preferably in a range of 12 to 18°.

Figure 13:
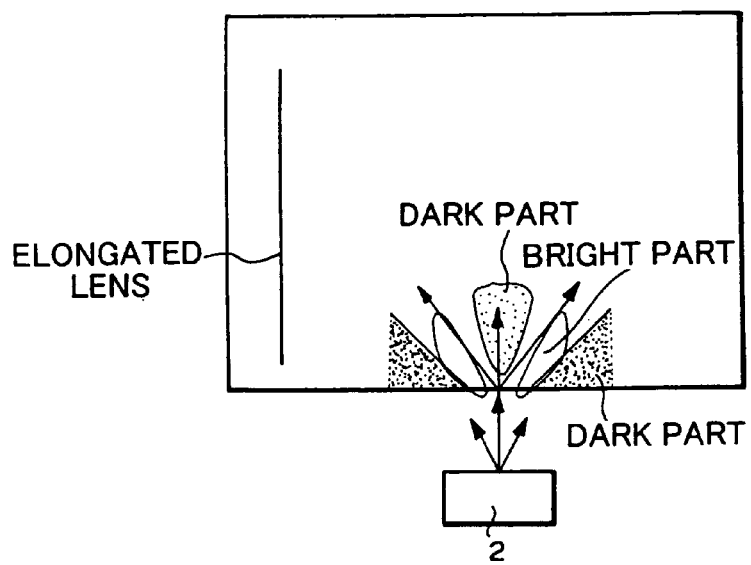
FIG. 13 is a schematic view explaining occurrence of non-uniformity of a luminance distribution in the planar light source device.

According to the present invention, it is possible to expand the emitted light distribution in the XY plane by roughening at least a part of the surfaces of the transversely elongated lenses 43a or the longitudinally elongated lenses 44a formed in the light guide 4, and to suppress an appearance of parts of an ununiform luminance distribution shown in FIG. 13. Incidentally, a surface on the opposite side to the elongated lens-formed surface may be roughened in place of the surfaces of the elongated lenses, or both surfaces can be roughened.

As for roughening degrees, an average slant angle θa defined in accordance with ISO 4287/1-1984 is preferably set in a range of 0.1 to 8°, more preferably in a range of 0.5 to 6°, further preferably in a range of 1 to 4°. If the average slant angle θa of the rough surface is less than 0.1°, there is a tendency that a sufficient expansion effect of the emitted light distribution in the XY plane cannot be obtained. If the average slant angle θa of the rough surface exceeds 8°, there is a tendency that shape destruction of the elongated lenses is enlarged to damage directive light emitting characteristics thereof, and the amount of an emitted light near the light incident end face is excessively increased to lower a uniformity ratio of luminance.

For the rough surface to be formed, an average slant angle thereof may be varied from place to place for the purpose of increasing a uniformity ratio of luminance in the light emitting face of the light guide. For example, if a bright/dark pattern or a light source image appears in a region near the light incident end face, such an appearance can be suppressed by increasing an average slant angle therein more than the other parts.

Figure 3:
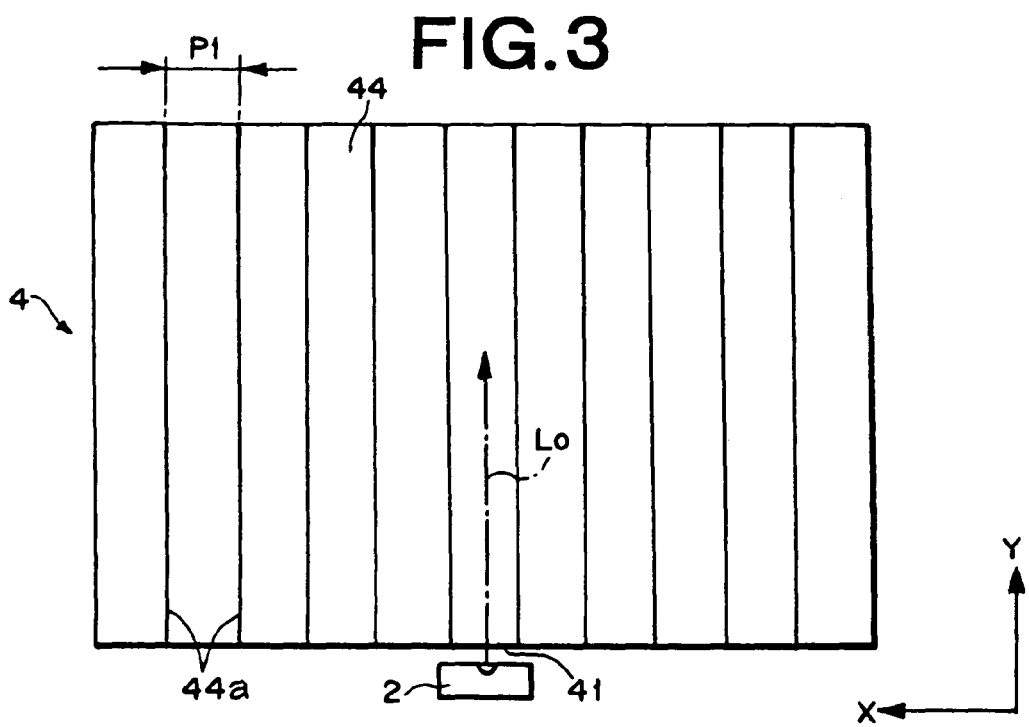
FIG. 3 is a bottom view showing the light guide of the invention together with the primary light source.
Figure 4:
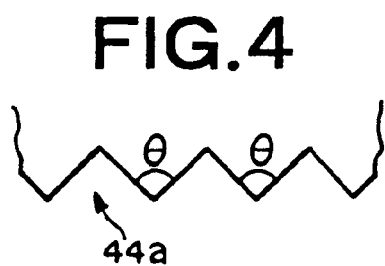
FIG. 4 is a partial, sectional view of the light guide of the invention.

Incidentally, according to the embodiment shown in FIG. 1A, on the other principal surface (bottom surface in the drawing) of the light guide 4, the longitudinal elongated lenses shown in FIG. 1B can be formed as shown in FIG. 3 for the purpose of controlling the emitted light distribution in the XY plane expanded by the rough surface, and bringing a direction of a light propagated in a direction oblique to the light incident end face of the light guide 4, in the XY plane, close to a direction substantially perpendicular to the light incident end face to emit the light. A number of elongated prisms 44a can be formed as longitudinally elongated lenses (ridgeline of each elongated prism 44a is shown in FIG. 3) arrayed in parallel with one another to extend substantially along the direction (direction of maximum intensity light In) of the directivity of the light emitted from the LED 2 and entered into the light guide 4.

Additionally, according to the embodiment shown in FIG. 1B, as the light emitting structure of the light guide 4, in place of the rough surface, a number of elongated lenses such as elongated prisms shown in FIG. 1A, elongated lenticular lenses, V-shaped grooves or the like can be employed. The elongated lenses arrayed in parallel with one anther to extend in a direction (X direction) substantially orthogonal to the direction of the directivity of the light emitted from the LED 2 and entered into the light guide 4 can be used. Incidentally, the horizontally elongated lenses in this case are not limited to linear shapes, but they may be bent to surround the LED 2.

The light deflecting device 6 is arranged on the light emitting face 43 of the light guide 4. Two principal surfaces of the light deflecting device 6 are positioned in parallel with the XY plane as a whole. One (principal surface positioned on the side of the light emitting face 43 of the light guide) of the two principal surfaces is set as a light entering surface 61, and the other surface is set as a light going-out surface 62. The light going-out surface 62 is a flat surface parallel to the light emitting face 43 of the light guide 4. The light entering surface 61 is an elongated prism formed surface in which a number of elongated prisms 61a as elongated lenses are continuously or intermittently arrayed.

The elongated prisms 61a of the light entering surface 61 are formed in parallel with one another to extend in a direction substantially orthogonal to the direction of the directivity of the light emitted from the LED 2 and entered into the light guide 4. According to the embodiment, the elongated prisms 61a extend in the X direction. The elongated prisms 61a are not limited to linear shapes, but they may be formed into shapes to extend in a direction substantially orthogonal to the propagation direction of the light emitted from the LED 2 and entered into the light guide 4. For example, the elongated prisms may be bent to surround the LED 2. An arraying pitch P2 of the elongated lenses 61a is preferably set in a range of 10 to 100 μm, more preferably in a range of 10 to 80 μm, further preferably in a range of 20 to 70 μm.

Additionally, in the case of a prism sheet on which the elongated prisms 61a are formed as shown in the embodiment, an angle formed between an elongated prism formed surface of the prism sheet and a prism surface of the elongated prisms 61a positioned farther from the primary light source is preferably set in a range of 40 to 80°, more preferably in a range of 45 to 75°, further preferably in a range of 50 to 70°. In the case of the elongated prisms isosceles triangular in section, apex angles are preferably set in a range of 20 to 100°, more preferably in a range of 30 to 90°, further preferably in a range of 40 to 80°. It is because such a range of the apex angles enables efficient deflection of the directive light emitted from the light guide 4 in a desired direction such as a normal direction of the light emitting face.

FIG. 6 shows a state of light deflection by the light deflecting device 6. The drawing shows a traveling direction of a peak emitted light (light corresponding to a peak of the emitted light distribution) from the light guide 4 in the YZ plane. The light obliquely emitted from the light emitting face 43 of the light guide 4 is entered into a first surface of the elongated prism 61a of the light deflecting device 6, and totally reflected on a second surface to be emitted substantially in the normal direction of the light going-out surface 62. In the XZ plane, the foregoing operation of the elongated prisms 44a of the light guide 4 enables sufficient improvement in luminance in the normal direction of the light going-out surface 62.

According to the present invention, the light deflecting device 6 performs a function of deflecting the emitted light from the light guide 4 in a target direction (angle changing function), and a lens sheet or the like having on at least one of the principal surfaces an elongated lens formed surface in which a number of elongated lenses are formed in parallel can be used. The use of the lens sheet is particularly preferable in the case of the light guide 4 of the present invention which emits a highly directive light. Various kinds of shapes of the elongated lenses formed on the lens sheet are used in accordance with purposes. For example, a prism shape, a lenticular lens shape, a fly-eye lens shape, a wave shape etc., are available. Among them, the prism sheet on which a number of elongated prisms substantially triangular in section is especially preferable. Additionally, the elongated prisms are not limited to the triangular shapes in section, but they may be formed into shapes in which tops of the triangles are curved or planar, or prism surfaces are convex or concave. Especially, the shapes in which the prism surfaces are convex are preferable in order to increase the directivity of the light emitted from the planar light source device, thereby improving luminance.

Figure 14:
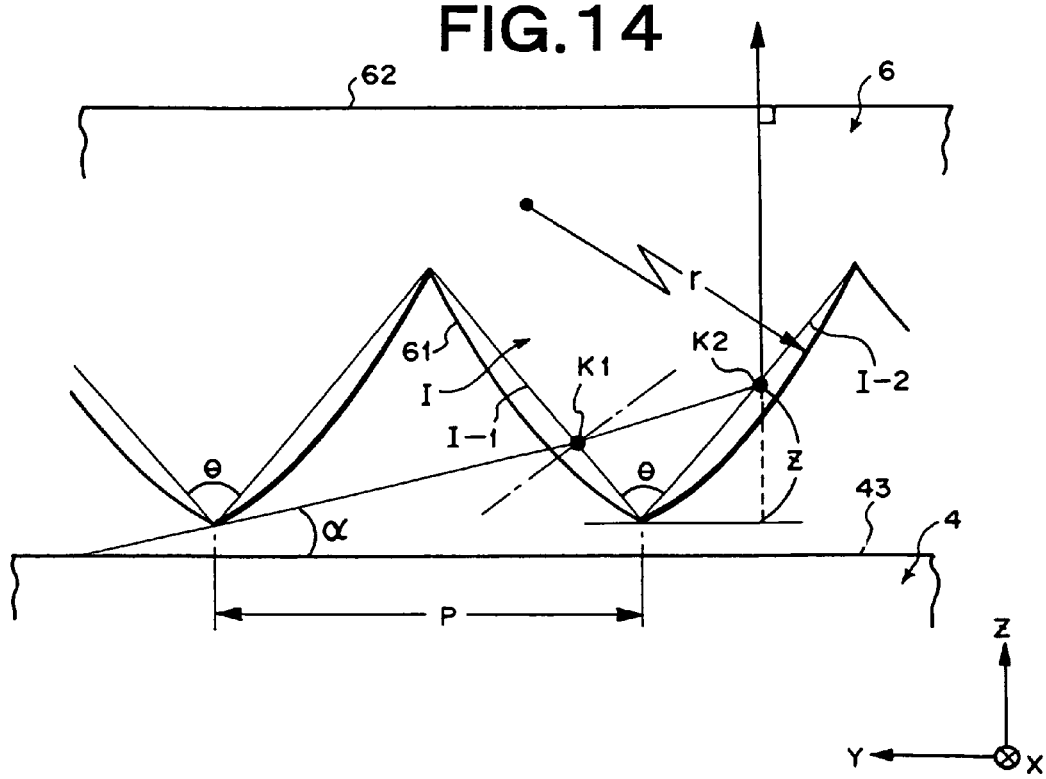
FIG. 14 is a partial sectional view especially showing the light deflecting device of the planar light source device of the invention.

To form the prism surface 41 into a convex shape, the shape thereof is set in the following manner. That is, as shown in FIG. 14, a virtual elongated prism I triangular in section is first set while an arraying pitch of the elongated prisms is P. An angle (i.e., virtual prism apex angle) formed between two prism surfaces I-1, I-2 of the virtual elongated prism I is set as θ. The virtual prism apex angle θ is set, for example, in such a manner that a peak emitted light (slant angle α) of an intensity distribution of a light which arrives from the light emitting face 43 of the light guide 4 in the YZ plane is entered into the virtual elongated prism I, internally totally reflected by the virtual prism surface I-2, and then travels in the normal direction of the light going-out surface 62. For example, if the peak emitted light of the light emitted from the light going-out surface 62 of the light deflecting device 6 is directed near the normal direction of the light going-out surface 62 (e.g., within a range of ±10 degrees from the normal direction), the virtual prism apex angle θ is preferably set in a range of 50° to 80°, more preferably in a range of 55° to 75°, further preferably in a range of 60° to 70°.

Next, by using the shape of the virtual elongated prism I set in the aforementioned manner as a reference, a real shape of the elongated prism is set so that at least one prism surface can be formed into a convex curved shape. Specifically, the real shape of the elongated prism is preferably set in the following manner. A virtual light is set in which the peak emitted light (slant angle a) of the emitted light distribution of the light emitted from the light emitting face 43 of the light guide 4 is entered low over the top of the adjacent virtual elongated prism on the primary light source side into the virtual prism I, a position at which the virtual light passes through the virtual prism surface I-1 is set as K1, and a position at which it reaches the virtual prism surface I-2 is set as K2. In this case, the elongated prism is preferably formed into a convex curved shape so that at a position nearer the light going-out surface 62 than the internal total-reflection position K2 of the virtual prism surface I-2 in the virtual elongated prism I, a part or an entire part thereof can have a slant angle of the prism surface larger than that of the virtual prism surface I-2 of the virtual elongated prism I.

In other words, in the Z-direction position in which a size z (Z-direction distance between the apex of the elongated prism and the internal reflection position K2 of the virtual prism surface I-2) shown in FIG. 14 is equal to or higher than a value represented by the following equation:

$$z=\{(P\cdot\tan\alpha\cdot\cot[\theta/2])/(\tan\alpha+\cot[\theta/2])\}\cdot[\cot[\theta/2]+\{\cot\theta/(\cot[\theta/2]-\cot\theta)\}]$$

The real prism surface has a slant angle larger than that of the prism surface I-2 of the virtual elongated prism I represented by the following equation:

$$n\cos[3\theta/2]=\sin(\alpha-[\theta/2])$$

By setting the shape of the elongated prism of the light entering surface 61 in such a manner, it is possible to reduce a distribution angle (half-value width) of the light emitted from the light deflecting device 6.

Next, the other embodiment of the light deflecting device 6 of the present invention will be described. The light deflecting device 6 described below is preferably arranged on the aforementioned light emitting face 43 of the light guide, or the light emitting face 43 of the light guide 4 in which the surface of the elongated lens formed on the back surface 44 is roughened. However, the arrangement is not limited to such a form. Even by arranging the device on the light emitting face 43 of the light guide 4 in which the surface of the elongated lens is not roughened, non-uniformity in the luminance distribution can be eliminated without deteriorating the emitted light distribution.

Figure 15:
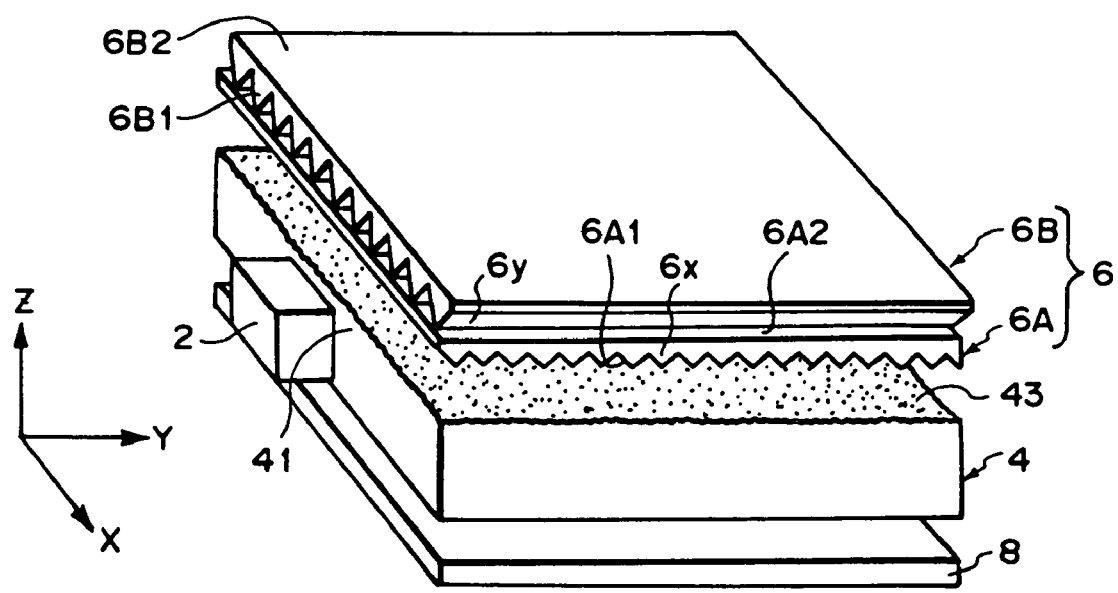
FIG. 15 is an exploded perspective view showing the planar light source device of the invention.

According to the present invention, as shown in FIG. 15, the light deflecting device 6 may be formed by superimposing two light deflection sheets 6A, 6B. The light deflection sheet 6A functions as a first light deflection sheet positioned closest to the light guide 4, and the light deflection sheet 6B functions as the other second light deflection sheet. These light deflection sheets are both positioned in parallel with the XY plane. One (principal surface positioned on the side of the light emitting face 43 of the light guide, i.e., bottom surface) of two principal surfaces of the light deflection sheet 6A is set as a light entering surface 6A1, and the other surface (i.e., top surface) is set as a light going-out surface 6A2. Similarly, one (principal surface positioned on the side of the light emitting face 43 of the light guide, i.e., bottom surface) of two main surfaces of the light deflection sheet 6B is set as a light entering surface 6B1, and the other surface (i.e., top surface) is set as a light going-out surface 6B2. That is, a light emitted from the light emitting face 43 of the light guide 4 is incident on the light entering surface 6A1 and entered into the first light deflection sheet 6A, and emitted from the light going-out surface 6A2. The emitted light is incident on the light entering surface 6B1 and entered into the second light deflection sheet 6B, and emitted from the light going-out surface 6B2.

The light entering surface 6A1 of the first light deflection sheet 6A is an elongated prism formed surface in which a plurality of first elongated lenses 6x are arrayed in parallel with one another to extend in a direction substantially parallel to the light incident end face 41 of the light guide. The first elongated lenses 6x are formed into substantially triangular sectional shapes in which apex angles are set in a range of 50 to 80°, preferably in a range of 50 to 70°. The first elongated lenses 6x extend in a direction substantially orthogonal to the direction of the directivity of the light emitted from the LED 2 and entered into the light guide 4, that is, in the X direction according to the embodiment. An arraying pitch of the first elongated lens 6x is preferably set in a range of 10 to 100 Mm, more preferably in a range of 10 to 80 μm, further preferably in a range of 20 to 70 μm. Additionally, the light going-out surface 6A2 of the first light deflection sheet 6A is a flat surface parallel to the light emitting face 43 of the light guide 4.

On the light entering surface 6B1 of the second light deflection sheet 6B, a plurality of linear structures each having concave or convex cross-section are arrayed in parallel with one another to extend in a direction substantially orthogonal to the light incident end face 41 of the light guide. According to the embodiment, the linear structures are constituted of elongated lenses, and the light entering surface 6B1 is an elongated lens formed surface in which a second elongated lens 6y is formed. The second elongated lens 6y is formed into a shape in which an average slant angle (measured in a direction orthogonal to a direction of the second elongated lens 6y) of the surface (elongated lens formed surface) on which the elongated lenses are formed is set in a range of 5 to 40°, preferably in a range of 12 to 30°, further preferably in a range of 15 to 28°. The second elongated lens 6y extends in the direction of the directivity of the light emitted from the LED 2 and entered into the light guide 4, that is, in the Y direction according to the embodiment. Additionally, the light going-out surface 6B2 of the second light deflection sheet 6B is a flat surface parallel to the light emitting face 43 of the light guide 4.

According to the embodiment, since the light entering surface 6B1 that has the second elongated lens 6y of the second light deflection sheet 6B is arranged on the flat light going-out surface 6A2 of the first light deflection sheet 6A to confront the same, no adhesion (sticking) occurs between the two light deflection sheets 6A, 6B, creating a favorable condition.

FIGS. 16 and 17 show states of light deflection by the light deflecting device 6. The drawings show traveling directions of a peak emitted light (light corresponding to a peak of the emitted light distribution) from the light guide 4 in the YZ plane and the XZ pane. As shown in FIG. 16, in the YZ plane, the light obliquely emitted from the light emitting face 43 of the light guide 4 is incident on a first surface of the first elongated lens 6x, and totally reflected on a second surface to be emitted substantially in the normal direction of the light going-out surface 6A2. Additionally, as shown in FIG. 17, in the XZ plane, the light emitted upward from the light going-out surface 6A2 of the first light deflection sheet 6A is refracted by the second elongated lens 6y to be obliquely emitted from the light-going out surface 6B2.

Since real lights emitted from the light guide have not only the peak emitted lights shown in FIGS. 16 and 17 but also the other lights within a certain distribution, lights emitted from the light deflecting device 6 have a certain distribution which includes emission directions of lights based on the peak emitted lights of FIGS. 16 and 17. Thus, the operation of the first elongated lens 6x enables sufficient improvement in luminance in the normal direction of the light going-out surface 6B2 in the YZ plane. This effect can be obtained well by setting an apex angle of the first elongated lens 6x in a range of 50 to 80°. If the apex angle is less than 50° or over 80°, this effect is reduced.

Further, the operation of the second elongated lens 6y enables proper expansion of an angle range around the normal direction of the light going-out surface 6B2 in the XZ plane.

Figure 18:
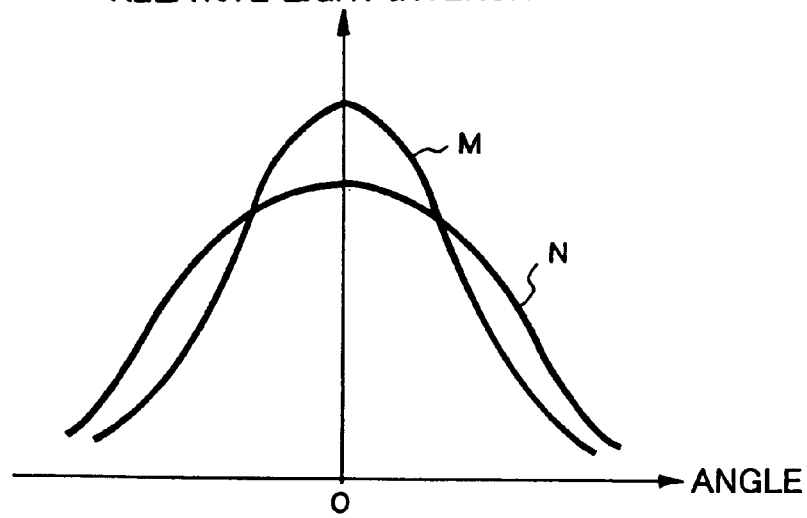
FIG. 18 is a view showing an emitted light intensity distribution of an LED and a light intensity distribution on a light emitting surface of the planar light source device.
Figure 19:
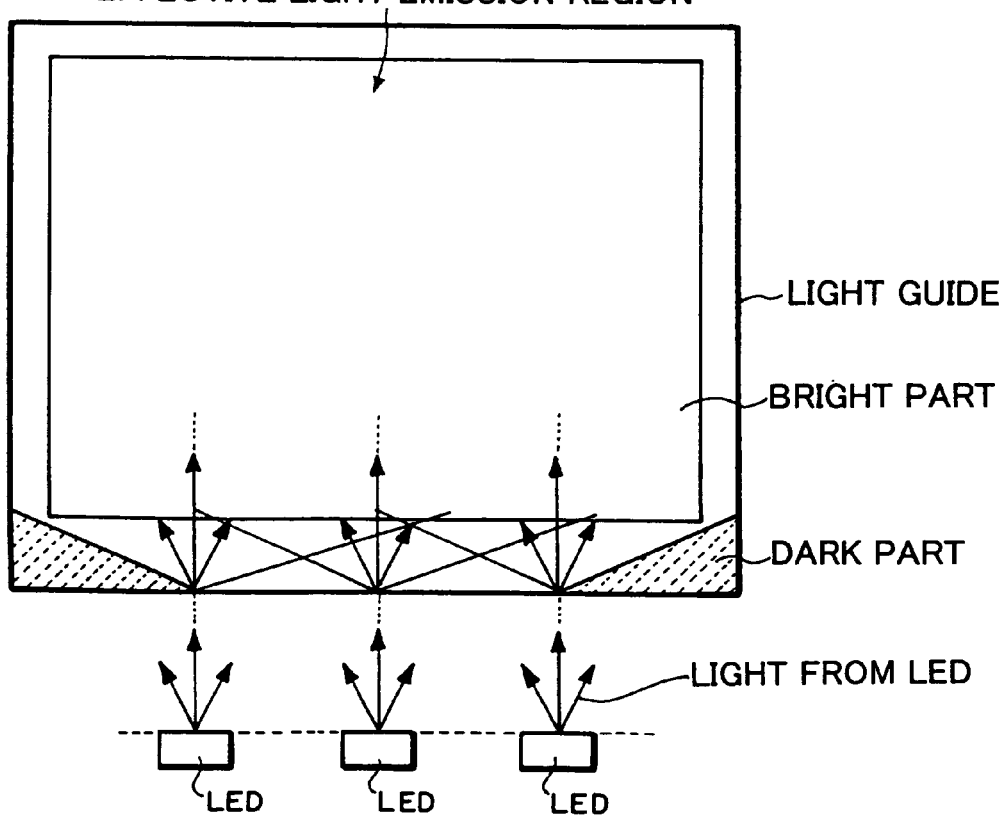
FIG. 19 is a plan view showing the light guide of the planar light source device of the invention together with the primary light source.

FIG. 18 shows a distribution M of a light emitted from the light emitting section of the LED 2 and entered into the light guide 4 in the XY plane. Here, the Y direction is set at an angle θ. The light that has such a distribution in the XY plane is passed through the light deflecting device 6, whereby the distribution in the XY plane can be widened more than the M as indicated by N in FIG. 18 especially by the operation of the second elongated lens 6y of the second light deflection sheet 6B. Thus, as shown in FIG. 19, by reducing a size of a region in which dark parts are generated, a light of a required intensity can be guided to a wide effective light emission region to increase a uniformity ratio of luminance.

As described above, by the operation of the second elongated lens 6y, the uniformity ratio of luminance is increased, the emitted light that has the distribution of a proper angle range in the plane parallel to the X direction is emitted, and thus a light is concentratedly emitted within a required visual field range for the planar light source device, whereby luminance can be improved. This effect can be obtained well by setting an average slant angle of the second elongated lens 6y in the XZ plane in a range of 5 to 40°, preferably in a range of 12 to 30°, more preferably in a range of 15 to 28°. If the average slant angle is less than 5° or over 40°, this effect is reduced.

Figure 20A:
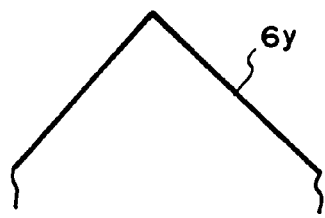
FIGS. 20A to 20E are views each showing a sectional shape of a second elongated lens of the light deflecting device of the planar light source device of the invention.
Figure 20B:
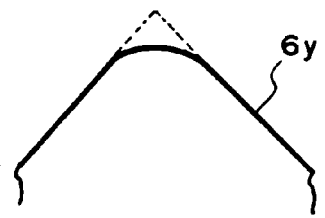
Figure 20C:
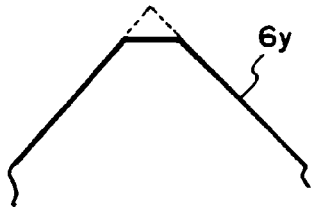
Figure 20D:
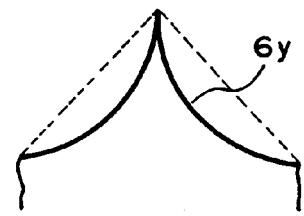
Figure 20E:
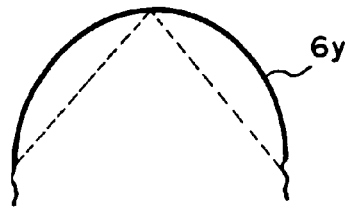

FIGS. 20A to 20E show specific embodiments of XZ sectional shapes of the second elongated lenses 6y. Incidentally, in FIGS. 20A to 20E, the XZ sectional shapes of the second elongated lenses 6y are shown upside down from those of FIGS. 1 to 4. FIG. 20A shows an isosceles triangular shape equivalent to that shown in each of FIGS. 15 to 17. FIG. 20B shows a substantially isosceles triangular shape in which a top is convex curved outward. FIG. 20C shows a substantially isosceles triangular shape in which a top is linear. FIG. 20D shows a substantially isosceles triangular shape in which two sides are both concave curved outward. FIG. 20E shows a substantially isosceles triangular shape in which two sides are both convex curved outward. The sectional shape of the second elongated lens 6y may be asymmetrical left and right depending on required light emitting characteristics. However, an average slant angle of surfaces (elongated lens formed surfaces) on which the second elongated lenses are formed is in a range of 5 to 40°. According to the present invention, the linear structures each having concave or convex surface formed on the second light deflection sheet 6B are not limited to the shapes shown in FIGS. 20A to 20E. As long as an average slant angle of the linear structures is within the range of 5 to 40°, for example, the structures may have hairline concave and convex shapes which extend in a direction substantially orthogonal to the light incident end face 41 of the light guide 4. In this case, the concave and convex shapes are preferably set in a range of 0.1 to 200 Mm in height, more preferably in a range of 0.1 to 100 Mm, further preferably in a range of 10 to 100 Mm. Such a height range of the concave and convex shapes increases a uniformity ratio of luminance, and emits a light which has a proper angle range in a plane parallel to the X direction, whereby a light can be concentratedly emitted in the direction of the required visual field range for the planar light source device to improve luminance. If the concave and convex shapes are too high, the concave and convex shapes tend to be easily viewed.

Figure 21:
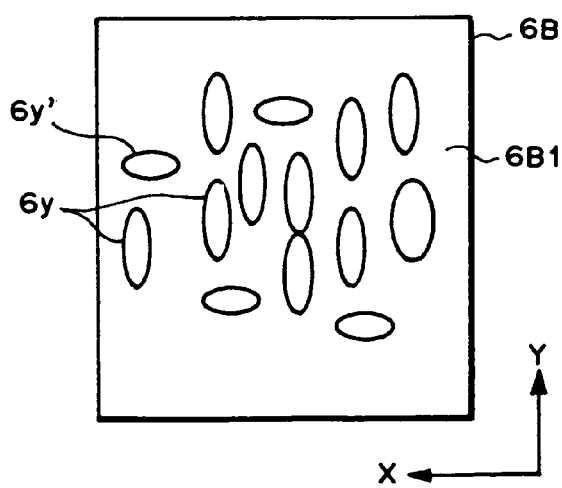
FIG. 21 is a plan view showing the second elongated lens of the light deflecting device of the planar light source device of the invention.

The second elongated lenses may be continuously or regularly arrayed as described above. But the second elongated lenses may be arrayed discontinuously (discretely) and/or irregularly. For example, as shown in FIG. 21, discontinuous Y-direction elongated lenses 6y can be formed on the light entering surface 6B1 of the second light deflection sheet 6B, and discontinuous X-direction elongated lenses 6y' can be further formed. In FIG. 21, elliptical shapes of the elongated lenses 6y, 6y' indicate directionality thereof, and a long-axis direction in each elliptical shape indicates directionality of the elongated lens. By using such irregularly arrayed second elongated lenses 6y, it is possible to suppress generation of moire caused by interferences with a liquid crystal display element or the light guide 4 (especially the light guide on a surface of which elongated lenses such as elongated prisms are formed) when the liquid crystal display element is arranged on the light deflecting device 6 to constitute a liquid crystal display device.

Incidentally, according to the present invention, within a range of not greatly losing a light expansion effect, the direction of the elongated lens 6y may be shifted from the direction orthogonal to the light incident end face 41 or the direction of the directivity of the light entered into the light guide 2. This shifting is preferably set in a range of less than 20°, more preferably in a range of less than 10°.

Figure 22:
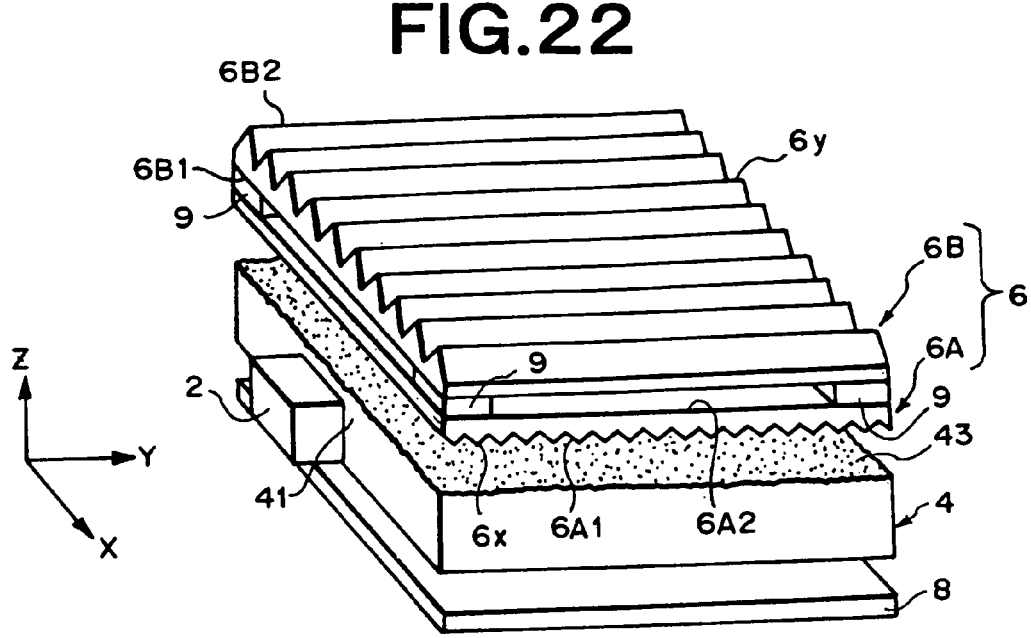
FIG. 22 is an exploded perspective view showing the planar light source device of the invention.
Figure 23:
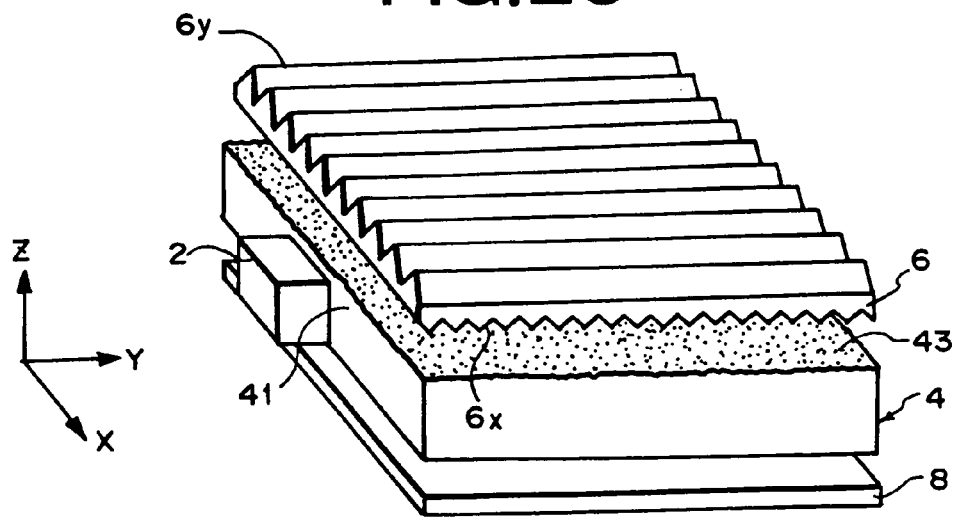
FIG. 23 is an exploded perspective view showing the planar light source device of the invention.

FIGS. 22 and 23 are exploded perspective views showing other embodiments of a planar light source device according to the present invention. In the drawings, members or sections having functions similar to those of FIGS. 15 to 21 are denoted by similar reference numerals.

According to the embodiment of FIG. 22, the second elongated lenses 6y are formed on the light going-out surface 6B2 of the second light deflection sheet 6B. The light entering surface 6B1 of the second light deflection sheet 6B is a flat surface parallel to the light emitting face 43 of the light guide 4. According to the embodiment, since the light going-out surface 6A2 of the first light deflection sheet and the light entering surface 6B1 of the second light deflection sheet are both flat surfaces, means is preferably disposed to prevent adhesion between the two light deflection sheets 6A, 6B. As such adhesion prevention means, it is possible to use a spacer 9 arranged to form a gap between the first and second light deflection sheets 6A, 6B, thereby separating them from each other.

As the adhesion prevention means, in addition, it is possible to use a light diffusion sheet arranged between the light going-out surface 6A2 of the first light deflection sheet and the light entering surface 6B1 of the second light deflection sheet. Further, at least one of the light going-out surface 6A2 of the first light deflection sheet and the light entering surface 6B1 of the second light deflection sheet may be roughened to constitute adhesion prevention means.

The light diffusion sheet, and the roughened light going-out surface 6A2 and/or light entering surface 6B1 have effects of further reducing luminance variance by contributing to the light expansion in the XY plane described above with reference to FIG. 18. Incidentally, the luminance variance reduction effect by the roughening is not limited to the case of the embodiment of FIG. 22. A similar effect can be obtained by roughening at least one of the light entering surface and the light going-out surface of at least one light deflection sheet which constitutes the light deflecting device 6. Moreover, a luminance variance reduction effect can be obtained by mixing light diffusing agents in at least one of the light deflection sheets.

According to the embodiment of FIG. 23, the light deflecting device 6 comprises only a first light deflection sheet. First elongated lenses 6x are formed on a light entering surface thereof, and second elongated lenses 6y are formed on a light going-out surface thereof. According to this constitution, the number of components is reduced to enable thinning of the device and, further, chances of mixing of foreign objects in the light deflecting device 6 are reduced.

For the light reflecting device 8, for example, a plastic sheet that has a metal deposited reflection layer on a surface can be used. According to the present invention, as the light deflecting device 8, in place of the reflection sheet, a light reflection layer or the like formed on the back surface 44 on the opposite side to the light emitting face of the light guide 4 by metal deposition or the like can be used. Incidentally, reflection members are preferably disposed on the four end faces (excluding light incident end faces 41, 42) of the light guide 4. The light guide 4 and the light deflecting device 6 of the present invention can be made of highly light-transmissive synthetic resins. As such synthetic resins, for example, a methacrylic resin, an acrylic resin, a polycarbonate resin, a polyester resin, a vinyl chloride resin, and a cyclic polyolefin resin are available. Especially, the methacrylic resin is most suitable because of its high light transmittance, heat resistance, dynamic characteristics, and molding processability.

As such a methacrylic resin, a resin that mainly contains methyl methacrylate by 80 wt % or more is preferable. For forming a surface structure of the rough surface of the light guide 4 or the light deflecting device 6, or a surface structure of an elongated prism or the like, such a structure may be formed by subjecting a transparent synthetic resin to hot pressing which uses a die member of a desired surface structure, or a shape may be imparted by screen printing, extrusion molding, injection molding or the like simultaneously with molding. Additionally, a structure surface can be formed by using a thermosetting resin, a photosetting resin or the like. Further, a rough surface structure or an elongated lens arraying structure made of an active energy curable resin may be formed on a transparent base material such as a transparent film, sheet or the like made of a polyester resin, an acrylic resin, a polycarbonate resin, a vinyl chloride resin, a polymethacrylic imido resin or the like. Alternatively, such a sheet may be bonded to another transparent base material by a method of adhesion, fusion or the like to be integrated. As the active energy curable resin, a multifunctional (meth)acrylic compound, a vinyl compound, (meth)acrylic acid ester, an aryl compound, metal salts of (meth)acrylic acids or the like can be used.

The light emitting structure of the light guide 4 can be formed so that an emission ratio can become an ununiform distribution in the light emitting face 43 of the light guide 4. For example, in the case of using the elongated prism 43a as the light emitting structure, an ununiform distribution of an emission ratio can be formed by executing roughening process to make ununiform a distribution of surface roughness of a rough surface formed on the surface thereof in the light emitting face 43.

According to the present invention, an average slant angle θa of the transversely elongated lenses and longitudinally elongated lenses that constitute the light emitting structure of the light guide 4 and rough surfaces formed thereon can be obtained by measuring rough surface shapes with use of a probe type surface roughness tester, obtaining a slant function ƒ(x) with a coordinate of a measuring direction set as x, and executing a calculation with the following equations (1) and (2), in accordance with ISO 4287/1-1984. Incidentally, in the case of the rough surfaces formed on the surfaces of the transversely elongated lenses and longitudinal elongated lenses, an average slant angle in a direction parallel to the extending direction thereof is measured. Here, L is a measured length, and Δa is a tangent of the average slant angle θa.

$$\Delta a = (1/L)\int_o^L |(d/dx)f(x)| dx \quad (1)$$

$$\theta a = \tan^{-1}(\Delta a) \quad (2)$$

Further, for the light guide 4, a light emission ratio is preferably set in a range of 0.5 to 5%, more preferably in a range of 1 to 3%. It is because if the light emission ratio is less than 0.5%, there is a tendency that the amount of a light emitted from the light guide 4 becomes small to disable acquisition of sufficient luminance, and if the light emission ratio exceeds 5%, there is a tendency that a large amount of light is emitted near the primary light source 2, and considerable light attenuation occurs in the Y direction in the light emitting face 43 to cause a reduction in uniformity of luminance thereon. Thus, by setting the light emission ratio of the light guide 4 in the range of 0.5 to 5%, it is possible to provide a planar light source device of high luminance that can emit a light of highly directive emission characteristics from the light guide 4 in which an angle of a peak light emitted from the light emitting face is in a range of 50 to 80° with respect to the normal of the light emitting face, and a half-value width of an emitted light distribution on a plane including the Y direction and perpendicular to the light emitting face 43 is in a range of 10 to 40°, and can efficiently deflect the emission direction thereof by the light deflecting device 6.

According to the present invention, the light emission ratio of the light guide 4 is defined as follows. A relation between intensity ($I_o$) of an emitted light from the light emitting face 43 at a position of the light incident end face 41 and intensity (I) of an emitted light from the light emitting face 43 at a position of a distance L from the light incident end face satisfies the following equation (3) if a thickness (Z-direction size) of the light guide 4 is t:

$$I = I_0 \cdot \alpha (1-\alpha)^{L/t} \quad (3)$$

Here, a constant a is a light emission ratio, which is a percentage (%) of light emitted from the light guide 4 per unit length (length equivalent to the thickness t of the light guide) in the Y direction on the light emitting face 43. The light emission ratio a can be obtained from a gradient of a line obtained by plotting the relation between a logarithm of light intensity of the light emitted from the light emitting face 43 on an ordinate and (L/t) on an abscissa.

A liquid crystal display device is constituted by arranging a liquid crystal display element on the light emitting surface (light going-out surface 62 of the light deflecting device 6) of the planar light source device which comprises the LED 2, the light guide 4, the light deflecting device 6 and the light reflecting device 8. The liquid crystal display device is observed by an observer through the liquid crystal display element from above in FIG. 1. Additionally, according to the present invention, since a sufficiently collimated light of a narrow distribution can be emitted from the planar light source device and entered into the liquid crystal display element, it is possible to obtain an image display of high uniformity in brightness and hue without tone reversal or the like at the liquid crystal display element, and light irradiation concentrated in a desired direction. Thus, it is possible to increase use efficiency of the amount of a light emitted from the primary light source for illumination in such a direction.

FIGS. 7A and 8 are plan and bottom views, respectively, showing the other embodiment of the light guide for the planar light source device of the present invention together with the LED. In the drawings, members or sections having functions similar to those of FIGS. 1A to 6 are denoted by similar reference numerals.

According to the embodiment, an TLF 2 as a primary light source in a point state is arranged adjacently to a light incident end face 41 formed in a notched part of a corner of a light guide 4. A maximum intensity light Lo emitted from the TLF 2 travels in parallel with a diagonal line connecting the corner of the light guide 4 in which the notched part is formed with a corner of a diagonal position thereof. According to the embodiment shown in FIG. 7A, elongated prisms 43a of a light emitting face 43 of the light guide extend in a direction orthogonal to the traveling direction of the maximum intensity light $L_0$ Elongated prisms 44a of a back surface 44 of the light guide extend in a direction parallel to the traveling direction of the maximum intensity light $L_0$ as shown in FIG. 8. A prism apex angle of the elongated prisms 43a, an average slant angle of rough surfaces formed thereon, and a prism apex angle of the elongated prisms 44a are similar to those of the embodiment shown in FIG. 1A. According to the embodiment, operation effects similar to those of the previous embodiments can be obtained.

Additionally, FIG. 7B is a bottom view showing the other embodiment of the light guide for the planar light source device of the present invention together with the LED. In the drawings, members or sections having functions similar to those of FIGS. 1A to 6 are denoted by similar reference numerals.

According to the embodiment shown in FIG. 7B, the elongated prisms 44a of the back surface 44 of the light guide extend in the direction parallel to the traveling direction of the maximum intensity light 4, and the light emitting face 43 of the light guide is roughened. A prism apex angles of the elongated prisms 44a, and an average slant angle of rough surfaces formed thereon are similar to those of the foregoing embodiment. According to the embodiment, operation effects similar to those of the previous embodiments can be obtained.

FIG. 9 is a plan view showing the other embodiment of the light guide for the planar light source device of the present invention together with the LED. In the drawings, members or sections having functions similar to those of FIGS. 1A to 8 are denoted by similar reference numerals.

According to the embodiment, elongated prisms 43a as transversally elongated lenses that constitute a light emitting structure extend in a direction substantially orthogonal to a propagation direction of a light emitted from the LED 2 and entered into the light guide 4 in a plane along the light emitting face thereof, in a bent shape to surround the LED 2. Thus, in the case of using the primary light source in the single point state such as the LED 2, the direction of the transversally elongated lenses 43a may be changed to a direction shifted from the direction orthogonal to the traveling direction of the maximum intensity light $L_0$, i.e., a direction substantially orthogonal to the propagation direction of real light rays, in a region other than a path (including its vicinity) of the maximum intensity light $L_0$ According to the embodiment, operation effects similar to those of the previous embodiment can be obtained.

FIGS. 10A and 10B are plan views showing the other embodiment of the light guide for the planar light source device of the present invention together with the LED. In the drawings, members or sections having functions similar to those of FIGS. 1A to 9 are denoted by similar reference numerals.

According to the embodiment, an average slant angle of rough surfaces formed on the surfaces of the elongated prisms 43a of the light emitting face 43 or the elongated prisms 44a of the back surface 44 varies from place to place. That is, in the case of constituting the planar light source device by using the light guide 4 and a liquid crystal display device by using the planar light source device, only a light emitted from an effective light emission region F of the light guide 4 directly contributes to displaying, while lights emitted from other parts are blocked by a structural member (i.e., frame). Thus, a relatively small average slant angle is set in first regions 431, 441 of the light emitting face 43 and the back surface 44 including the effective light emission region F, while an average slant angle larger than that in the first regions 431, 441 is set in second regions 432, 442 (regions near the light incident edge including the light incident end face 41) other than the first regions 431, 441. Accordingly, in the second regions 432, 442, expansion of the light in the XY plane is made uniform to prevent appearance of an image of the primary light source in the effective light emission region F. In the first regions 431, 441, roughness of the rough surfaces is controlled to maintain a proper emission ratio, and emission of a light converged in the plane parallel to the X direction by the elongated prisms 44a of the back surface 44 is secured. For such a purpose, an average slant angle of the rough surfaces of the first regions 431, 441 is preferably set in a range of 0.5 to 4°, while an average slant angle of the rough surfaces of the second regions 432, 442 is preferably set in a range of 2 to 8°.

Thus, according to the present invention, for the purpose of further improving uniformity in luminance distribution, light expansion may be partially adjusted by forming a region of a rough surface average slant angle larger or smaller than other regions in a partial region of the elongated lenses. In this case, in the region in which the average slant angle is different from the other region, an influence given to an emission ratio of the light guide is different from those of the other regions. Thus, an emission ratio of the light guide is preferably set approximately equal by adjusting the average slant angle of the rough surfaces formed in the corresponding region in the opposite surface to compensate for the difference in the embodiment of FIG. 10A, for example, making smaller the average slant angle of the rough surfaces formed on the surfaces of the transversely elongated lenses of the light emitting structure in regions of a larger average slant angle of the rough surfaces formed on the opposite surface, or adjusting the average slant angle of the light emitting structure in the region corresponding to the region thereof to compensate for the difference in the embodiment of FIG. 10B, for example, making smaller the average slant angle of the light emitting structure in regions of a larger average slant angle of the rough surfaces formed on the surfaces of the longitudinally elongated lenses.

According to the foregoing embodiments, all the surfaces of the elongated lenses formed on the light emitting face 43 or back surface 44 of the light guide are roughened to constitute the light emitting structure. According to the present invention, however, only a partial region (e.g., near the top) of each elongated prism may be roughened. In this case, an area ratio of the rough surface region is preferably set to 20% or higher in order to sufficiently exhibit the aforementioned operation effects.

According to the embodiments, one LED 2 is arranged as a primary light source. According to the invention, however, point light sources such as a plurality of LED's may be used. In this case, the plurality of point light sources may be arranged close to one another, at proper distances along the same edge of the light guide, or adjacently to two parallel edges of the light guide. Additionally, the point light sources may be arranged adjacently in notched parts formed at diagonal positions of the light guide. The plurality of point light sources are preferably arranged so that directions of maximum intensity lights Lo emitted therefrom can be parallel to each other.

In the foregoing description, the light emitting structure is formed on the light emitting face 43 of the light guide 4, and the principal surface (back surface) on the opposite side is set as the elongated prism formed surface 44 of the elongated prisms 44a. According to the invention, however, the light emitting face may be set as an elongated prism formed surface of the elongated prisms 44a, and a light emitting structure may be formed on the principal surface on the opposite side thereto.

EXAMPLES

Next, examples of the present invention and comparative examples will be described. In the examples and the comparative examples, measurement of average slant angles, measurement of luminance distributions, and measurement of luminance variance for evaluating uniformity in luminance distributions were carried out as follows.

Measurement of Average Slant Angle

With use of a probe type surface roughness tester (Surfcom 570A by Tokyo Seiki Co., Ltd.), measurement was carried out at a driving speed of 0.03 mm/sec., by using a 1 μmR, 55° conical diamond probe (010-2528). After correction of a slant from an average line of extracted curves, a center line average value of differential curves thereof was obtained in accordance with the equations (1) and (2). Incidentally, for measurement of an average slant angle of rough surfaces on the surfaces of the elongated prisms, the measurement was carried out along the extending direction of the elongated prisms by the probe type surface roughness tester.

Measurement of Luminance Variance

Luminance measurement was carried out on the light emitting face of the planar light source device in a region of 0.5 mm width at 4 mm to 4.5 mm from the edge of the light incident end face side at positions of 1 mm intervals along a longitudinal direction of the region, and a ratio of minimum and maximum values (minimum value/maximum value) of a measured luminance value was obtained.

Measurement of Luminance Distribution

Black paper having a pinhole of 4 mm.phi. was fixed on the surface of the planar light source device to position the pinhole on the center of the surface, a distance was adjusted to set a measured circle of 8 to 9 mm at a luminance meter, and adjustment was made to rotate rotational shafts of a goniometer around the pinhole in the YZ plane (or in a plane perpendicular to the light emitting face and extending in the front direction of the LED light source) and the XZ plane (or in a plane perpendicular to the light emitting face and perpendicular to the front direction of the LED light source). A luminance distribution of an emitted light was measured by the luminance meter by rotating the rotational shaft with in a range of +80° to −80° at intervals of 0.50 with respect to each direction.

Example 1

An elongated prism pattern in which elongated prisms having isosceles triangular sections of apex angles 172° and pitches of 50 μm were continuously disposed in parallel with a side of a length 34 mm was formed by cutting on a mirror-finished surface of a brass plate of an effective area 34 mm×48 mm and a thickness 3 mm. Then, the surface was roughened by using glass beads (FGB-400 by Fuji Manufacturing Co., Ltd.) of particle diameters of 53 μm or less, and subjecting the entire surface to blasting at a distance of 40 cm from the brass plate to a spray nozzle, and at spray pressure of 0.4 kgf/cm². Thus, a first mold having a shape transfer surface of the roughened elongated prism pattern was obtained.

Additionally, a second mold made of a mirror-finished brass plate having an effective area of 34 mm×48 mm and a thickness of 3 mm was obtained.

Injection molding of a transparent methacrylic resin was carried out by using the first and second molds to manufacture a transparent acrylic resin plate formed into a rectangle of a short side 34 mm and a long side 48 mm, and into a wedge shape whose thickness was changed from 1 mm to 0.7 mm along the long side, one surface of which had an elongated prism formed surface having a rough surface, and the other surface of which was a mirrored surface. This resin plate was set as a light guide. An average slant angle of the rough surface of the elongated prism formed surface of the obtained light guide was 1.2°.

An elongated prism pattern in which elongated prisms having isosceles triangular sections of apex angles 65° and pitches of 50 μm were continuously disposed in parallel with a side of a length 34 mm was formed by cutting on a mirror-finished surface of a brass plate of an effective area 34 mm×48 mm and a thickness 3 mm. Accordingly, a mold was obtained. An acrylic ultraviolet curable composition was injected into the obtained mold, and a polyester film of 188 μm (A4000 by Toyobo Co., Ltd., refractive index 1.600) was stacked thereon. Subsequently, the acrylic ultraviolet curable composition was irradiated with ultraviolet rays through the polyester film by using a high-pressure mercury lamp to be cured, and separated from the mold to obtain a prism sheet. For the obtained prism sheet, on one side of the polyester film, an elongated prism pattern in which elongated prisms made of ultraviolet curable resin of refractive index 1.528 were continuously disposed in parallel with each other was formed.

Three LED's (NSCW215biR by Nichia Corporation) were arranged at intervals of 9.0 mm to confront a short side end face of a light guide of a thickness 1 mm. A light scattering reflection sheet (SU-119 by Tsujimoto Electric Manufacturing Co., Ltd.) was arranged on a second elongated prism formed surface of the light guide. On a first elongated prism formed surface, the prism sheet was arranged so as to set its elongated prism formed surface facing a light emitting face of the light guide, and elongated prisms in parallel with the short side end face of the light guide. Accordingly, a planar light source device similar to that shown in FIG. 12 was manufactured. That is, the first elongated prism formed surface of the light guide was used as the light emitting face equipped with a light emitting structure. Incidentally, an effective light emission region F of the obtained planar light source device was as shown in FIG. 12.

When luminance variance was measured in a region of a width 0.5 mm near a light incident end face of the effective light emission region F of the obtained planar light source device, a ratio of minimum and maximum values of luminance (minimum value/maximum value) was 0.7, and no luminance variance was observed in the effective light emission region F. Moreover, when an emitted light distribution was measured in the effective light emission region F of the obtained planar light source device, a peak light was 0° with respect to a normal of the light emitting face, a half-value width in the YZ plane was 220, a half-value width in the XZ plane was 60°, and normal luminance was 1300 cd/m².

Example 2

An elongated prism pattern in which elongated prisms having isosceles triangular sections of apex angles 1300 and pitches of 50 μm were continuously disposed in parallel with a side of a length 48 mm was formed by cutting on a mirror-finished surface of a brass plate of an effective area 34 mm×48 mm and a thickness 3 mm. Thus, a second T-old having a shape transfer surface of the elongated prism pattern was obtained.

By using the first mold used in the Example 1 and the above second mold, injection molding was carried out as in the case of the Example 1 to manufacture a transparent acrylic resin plate formed into a rectangle of a short side 34 mm and a long side 48 mm, and into a wedge shape whose thickness was changed from 1 mm to 0.7 mm along the long side, one surface of which had a first elongated prism formed surface having a roughened surface, and the other surface of which had a second elongated prism formed surface. This resin plate was set as a light guide.

By using the obtained light guide, a planar light source device was manufactured as in the case of the Example 1.

When luminance variance was measured in a region of a width 0.5 mm near a light incident end face of the effective light emission region F of the obtained planar light source device, a ratio of minimum and maximum values of luminance (minimum value/maximum value) was 0.75, and no luminance variance was observed in the effective light emission region F. Moreover, when an emitted light distribution was measured in the effective light emission region F of the obtained planar light source device, a peak light was 0° with respect to a normal of the light emitting face, a half-value width in the YZ plane was 24°, a half-value width in the XZ plane was 550, and normal luminance was 1800 cd/m².

Example 3

A circular-arc elongated prism pattern in which circular-arc elongated prisms having isosceles triangular sections of apex angles 160° and pitches of 30 μm were concentrically formed around the vicinity of one corner of a square shape of 48 mm×34 mm, and flat parts of 30 to 200 μm were formed between every adjacent circular-arc elongated prisms so as to gradually narrow its width as the distance from the center increases was formed by cutting in an effective region of 40 mm×30 mm on a mirror-finished surface of a brass plate of 48 mm×34 mm and a thickness 3 mm. Then, the surface was roughened by using glass beads (FGB-400 by Fuji Manufacturing Co., Ltd.) of particle diameters of 53 μm or less, and subjecting the entire surface to blasting at a distance of 40 cm from the brass plate to a spray nozzle, and at spray pressure of 0.2 kgf/cm. Thus, a first mold having a shape transfer surface of the roughened elongated prism pattern was obtained.

By using the obtained first mold and a second mold of the mirror-finished brass plate having an effective area of 34 mm×48 mm and a thickness of 3 mm, as in the case of the Example 1, a transparent acrylic resin plate was manufactured in a rectangular shape of a short side 34 mm and a long side 48 mm, and in a plate shape of a thickness 0.8 mm, one surface of which had a first circular-arc elongated prism formed surface having a roughened surface, and the other surface of which was a mirrored surface. One corner corresponding to the center of the circular-arc elongated prisms was notched so as to set an end face length of 6 mm, thereby forming a notched part. Thus, a light guide was obtained. An average slant angle of rough surfaces of the first elongated prism formed surface of the obtained light guide was 0.6°.

Additionally, a circular-arc elongated prism pattern in which circular-arc elongated prisms having isosceles triangular sections of apex angles 63° and pitches of 50 μm were continuously disposed in parallel around a corner of a square shape of 34 mm×48 mm was formed by cutting on a mirror-finished surface of a brass plate of 34 mm×48 mm and a thickness 3 mm. Accordingly, a mold was obtained. By using the obtained mold, as in the case of the Example 1, a prism sheet in which circular-arc elongated prisms are continuously disposed in parallel with each other around one corner of the light guide was obtained.

A light diffusion reflection sheet (SU-119 by Tsujimoto Electric Manufacturing Co., Ltd.) was arranged on a surface of the light guide obtained on which the circular-arc elongated prism pattern was formed. On a flat surface of the light guide that became a light emitting face, the obtained prism sheet was arranged so as to set the circular-arc elongated prism pattern formed surface as a light guide side, and to superpose the corner that became a center of the formed circular-arc elongated prisms on the notched part of the light guide. Additionally, in the notched part of the light guide, an LED array in which two LED light sources of a peak half-value width in a direction parallel to the light emitting face of the light guide set to 115° (±57.5°) and a peak half-value width of a perpendicular direction set to 110° (±55°) were installed was arranged, and a current of 30 mA was supplied.

No luminance variance was observed in an effective light emission region F of the obtained planar light source device. Moreover, when an emitted light distribution was measured in the effective light emission region F of the obtained planar light source device, a peak light was 0° with respect to a normal of the light emitting face, a half-value width in a plane perpendicular to the light emitting face and extending in a front direction of the LED light source was 27°, a half-value width in a plane orthogonal thereto and perpendicular to the light emitting face was 22°, and normal luminance was 3200 cd/m².

Example 4

In obtaining the first mold of the Example 3, after the cutting formation of the circular-arc elongated prism pattern, an entire surface was subjected to blasting at a distance of 40 cm from the brass plate to a spray nozzle and at spray pressure of 0.2 kgf/cm² to be roughened. Then, the surface was subjected to blasting at spray pressure of 0.4 kgf/cm² at an area in a range of a distance 20 mm or more from a position corresponding to an end face of a notched part formed in the light guide in a post process to be roughened. Further, the surface was subjected to blasting at spray pressure of 0.6 gf/cm² at an area in a range of a distance 40 mm or more from the position corresponding to the end face of the notched part formed in the light guide in the post process to be roughened. An average slant angle of rough surfaces of the elongated prism formed surface of the obtained light guide was 0.60 in a range of a distance less than 20 mm from the end face of the notched part, 1.2° in a range of a distance equal to or greater than 20 mm but less than 40 mm from the end face of the notched part, and 2.00 in a range of a distance equal to or greater than 40 mm from the end face of the notched part.

Other than the above, all were similar to those of the Example 3, and a planar light source device was obtained. No luminance variance was observed in an effective light emission region F of the obtained planar light source device. Moreover, when an emitted light distribution was measured in the effective light emission region F of the obtained planar light source device, a peak light was 0° with respect to a normal of the light emitting face, a half-value width in a plane perpendicular to the light emitting face and extending in a front direction of the LED light source was 28°, a half-value width in a plane orthogonal thereto and perpendicular to the light emitting face was 23°, and normal luminance was 3400 cd/m².

Example 5

As a prism sheet, an elongated prism formed surface in a sectional shape of each elongated prism was formed into a convex curved shape of a curvature radius 400 μm. Other than this, all were similar to those of the Example 3, and a planar light source device was obtained.

No luminance variance was observed in an effective light emission region F of the obtained planar light source device. Moreover, when an emitted light distribution was measured in the effective light emission region F of the obtained planar light source device, a peak light was 0° with respect to a normal of the light emitting face, a half-value width in a plane perpendicular to the light emitting face and extending in a front direction of the LED light source was 21°, a half-value width in a plane orthogonal thereto and perpendicular to the light emitting face was 22°, and normal luminance was 4000 cd/m².

Comparative Example 1

No blasting was carried out for a first mold having a shape transfer surface of a prism pattern. Other than this, all were similar to the Example 1, and a planar light source device was manufactured. When luminance variance was measured in a region of a width 0.5 mm near a light incident end face of the effective light emission region F of the obtained planar light source device, a ratio of minimum and maximum values of luminance (minimum value/maximum value) was 0.1, and luminance variance as shown in FIG. 13 was observed in the effective emission region F. Moreover, when an emitted light distribution was measured in the effective light emission region F of the obtained planar light source device, a peak light was 0° with respect to a normal of the light emitting face, a half-value width in the YZ plane was 20°, a half-value width in the XZ plane was 10°, and normal luminance was 3200 cd/m².

Comparative Example 2

In the Example 1, when the first mold was manufactured, the entire surface was subjected to blasting at spray pressure of 0.6 kgf/cm² and at a distance of 15 cm from the brass plate to the spray nozzle to be roughened. Others were under the same conditions of the Example 1, and a planar light source device was manufactured.

An average slant angle of rough surfaces of an elongated prism formed surface of the obtained light guide was 10°. For the obtained planar light source device, a ratio of minimum and maximum values of luminance was 0.7. In an effective light emission region F, luminance only near the LED 2 was high, while luminance in other parts was low, exhibiting a low uniformity ratio of luminance.

Example 6

A mirror-finished surface of a stainless steel plate of an effective area 34 mm×48 mm and a thickness 3 mm was roughened by using glass beads (FGB-400 by Fuji Manufacturing Co., Ltd.) of particle diameters of 53 μm or less, and subjecting the entire surface to blasting at a distance of 40 cm from the stainless steel plate to a spray nozzle, and at spray pressure of 3.0 kgf/cm². Thus, a first mold having a shape transfer surface of a rough surface was obtained.

Additionally, an elongated prism pattern in which elongated prisms having isosceles triangular sections of apex angles 130° and pitches of 50 μm were continuously formed in parallel with a side of a length 48 mm was formed by cutting on a mirror-finished surface of a brass plate having an effective area 34 mm×48 mm and a thickness 3 mm. Then, the surface was roughened by using glass beads (FGB-400 by Fuji Manufacturing Co., Ltd.) of particle diameters of 53 μm or less, and subjecting the entire surface to blasting at a distance of 40 cm from the brass plate to a spray nozzle, and at spray pressure of 1.0 kgf/cm². Thus, a second mold having a shape transfer surface of the roughened elongated prism pattern was obtained.

Injection molding was carried out by using the first and second molds to manufacture a transparent acrylic resin plate formed into a rectangle of a short side 34 mm and a long side 48 mm, and into a wedge shape whose thickness was changed from 1 mm to 0.7 mm along the long side, one surface of which had a rough surface, and the other surface of which had an elongated prism formed surface of a roughened surface. This resin plate was set as a light guide. An average slant angle of rough surface of the obtained light guide was 3.40, while an average slant angle of the rough surfaces of the elongated prism formed surface was 5.0°.

Three LED's (NSCW215biR by Nichia Corporation) were arranged at intervals of 9.0 mm to confront a short side end face of the light guide of a thickness 1 mm. A light scattering reflection sheet (SU-119 by Tsujimoto Electric Manufacturing Co., Ltd.) was arranged on an elongated prism surface of the light guide. On the rough surface of the light guide, a prism sheet (M165 by Mitsubishi Rayon Co., Ltd.) in which a number of elongated prisms of apex angles 65° and pitches 50 μm were formed in parallel with each other was arranged so as to set the elongated prism formed surface thereof facing the rough surface of the light guide. Accordingly, a planar light source device as shown in FIG. 12 was manufactured. That is, the surface constituted of the rough surface of the light guide was used as the light emitting face. Incidentally, an effective light emission region F of the obtained planar light source device was as shown in FIG. 12.

When luminance variance was measured in a region of a width 0.5 mm near a light incident end face of the effective light emission region F of the obtained planar light source device, a ratio of minimum and maximum values of luminance (minimum value/maximum value) was 0.7, and no luminance variance was observed in the effective light emission region F.

Example 7

An elongated prism pattern in which elongated prisms having isosceles triangular sections of apex angles 130° and pitches 50 μm were continuously disposed in parallel with a side of a length 48 mm was formed by cutting on a mirror-finished surface of a brass plate of an effective area 34 mm×48 mm and a thickness 3 mm. Then, an acrylic resin shield plate was arranged apart by 40 mm from the surface of the brass plate to cover a part other than a width 4 mm near one side of a length 34 mm of the brass plate, and a region of the surface of the brass plate not covered with the shield plate was roughened by using glass beads (FGB-400 by Fuji Manufacturing Co., Ltd.) of particle diameters of 53 μm or less, and executing blasting in a belt shape of a width 4 mm at a distance of 40 cm from the brass plate to a spray nozzle, and at spray pressure of 1.0 kgf/cm². Thus, a first mold having a shape transfer surface of a partially roughened prism pattern was obtained.

Additionally, for a mirror-finished surface of a stainless steel plate of an effective area 34 mm×48 mm and a thickness 3 mm, full-surface blasting was carried out by using glass beads (FGB-400 by Fuji Manufacturing Co., Ltd.) of particle diameters of 53 μm or less, at a distance of 40 cm from the stainless steel plate to a spray nozzle, and at spray pressure of 1.0 kgf/cm². Subsequently, an acrylic resin shield plate was arranged apart by 40 mm from the surface of the stainless steel plate to cover a part of a width 4 mm near one side of a length 34 mm of the stainless steel plate, and a region of the surface of the stainless steel plate not covered with the shield plate was roughened by using glass beads (FGB-400 by Fuji Manufacturing Co., Ltd.) of particle diameters of 53 μm or less, and executing blasting at a distance of 40 cm from the stainless steel plate to a spray nozzle, and at spray pressure of 3.0 kgf/cm². Thus, a second mold having a shape transfer surface of a rough surface was obtained.

Injection molding was carried out by using the first and second molds to manufacture a transparent acrylic resin plate formed into a rectangle of a short side 34 mm and a long side 48 mm, and into a wedge shape whose thickness was changed from 1 mm to 0.7 mm along the long side. This resin plate was set as a light guide. During the injection molding, the two molds were arranged such that parts blasted in belt shapes confronted each other, and these parts blasted in the belt shapes were set on a thick side of the light guide. An average slant angle of a rough surface of the obtained light guide was 0.5° in a belt-shaped region of 4 mm from the thick end face, and an average slant angle was gradually changed in a belt-shaped region of about 1 mm adjacent to the belt-shaped region of 4 mm, while an average slant angle was 3.4° in other regions. Additionally, an average slant angle of rough surfaces of the elongated prism formed surface was 5.0° in the belt-shaped region of 4 mm from the thick end face.

By using the obtained light guide, as in the case of the Example 6, a planar light source device as shown in FIG. 12 was manufactured. When luminance variance was measured in a region of a width 0.5 mm near a light incident end face of the effective light emission region F of the obtained planar light source device, a ratio of minimum and maximum values of luminance (minimum value/maximum value) was 0.7, and no luminance variance was observed in the effective light emission region F.

Comparative Example 3

As in the case of the Example 6 except for the fact that no blasting was carried out for the second mold having a shape transfer surface of an elongated prism pattern, a planar light source device was manufactured. When luminance variance was measured in a region of a width 0.5 mm near a light incident end face of an effective light emission region F of the obtained planar light source device, a ratio of minimum and maximum values of luminance (minimum value/maximum value) was 0.2, and luminance variance as shown in FIG. 13 was observed in the effective light emission region F.

Comparative Example 4

For a mirror-finished surface of a stainless steel plate of an effective area 34 mm×48 mm and a thickness 3 mm, full-surface blasting was carried out by using glass beads (FGB-400 by Fuji Manufacturing Co., Ltd.) of particle diameters of 53 µm or less, at a distance of 40 cm from the stainless steel plate to a spray nozzle, and at spray pressure of 3.0 kgf/cm². Subsequently, an acrylic resin shield plate was arranged apart by 40 mm from the surface of the stainless steel plate to cover a part other than a width 4 mm near one side of a length 34 mm of the stainless steel plate, and a region of the surface of the stainless steel plate not covered with the shield plate was roughened by using glass beads (FGB-400 by Fuji Manufacturing Co., Ltd.) of particle diameters of 53 µm or less, and executing blasting in a belt shape of a width 4 mm at a distance of 40 cm from the stainless steel plate to a spray nozzle, and at spray pressure of 5.0 kgf/cm². Thus, a first mold having a shape transfer surface of a rough surface was obtained.

Additionally, an elongated prism pattern in which elongated prisms having isosceles triangular sections of apex angles 130° and pitches 50 µm were continuously disposed in parallel with a side of a length 48 mm was formed by cutting on a mirror-finished surface of a brass plate of an effective area 34 mm×48 mm and a thickness 3 mm. Thus, a second mold having a shape transfer surface of an elongated prism pattern was obtained.

Injection molding was carried out by using the first and second molds to manufacture a transparent acrylic resin plate formed into a rectangle of a short side 34 mm and a long side 48 mm, and into a wedge shape whose thickness was changed from 1 mm to 0.7 mm along the long side. This resin plate was set as a light guide. During the injection molding, the two molds were arranged such that a part of the first mold blasted in the belt shape was set on a thick side of the light guide. An average slant angle of a rough surface of the obtained light guide was 5.0° in a belt-shaped region of 4 mm from the thick end face, and an average slant angle was gradually changed in a belt-shaped region of about 1 mm adjacent to the belt-shaped region of 4 mm, while an average slant angle was 3.4° in other regions.

By using the obtained light guide, as in the case of the Example 6, a planar light source device as shown in FIG. 12 was manufactured. For the obtained planar light source device, a ratio of minimum and maximum values of luminance (minimum value/maximum value) was 0.2, and luminance variance as shown in FIG. 13 was observed in an effective light emission region F. Further, luminance was high only near the TLF in the effective light emission region F, exhibiting a low uniformity ratio of luminance.

Example 8

A mirror-finished surface of a stainless steel plate of an effective area 34 mm×48 mm and a thickness 3 mm was roughened by using glass beads (FGB-400 by Fuji Manufacturing Co., Ltd.) of particle diameters of 53 µm or less, and subjecting an entire surface to blasting at a distance of 40 cm from the stainless steel plate to a spray nozzle, and at spray pressure of 3.0 kgf/cm². Thus, a first mold having a shape transfer surface of a rough surface was obtained.

Additionally, an elongated lens pattern in which lenticular elongated lenses having sectional shapes of an average slant angle 25° and pitches 50 µm were continuously disposed in, parallel with a side of a length 48 mm was formed by cutting on a mirror-finished surface of a brass plate of an effective area 34 mm×48 mm and a thickness 3 mm. Thus, a second mold having a shape transfer surface of an elongated lens pattern was obtained.

Injection molding was carried out by using the first and second molds to manufacture a transparent acrylic resin plate formed into a rectangle of a short side 34 mm and a long side 48 mm, and into a wedge shape whose thickness was changed from 1 mm to 0.6 mm along the long side, one surface of which had a rough surface, and the other surface of which had an elongated lens formed surface. This resin plate was set as a light guide. An average slant angle of a rough surface of the obtained light guide was 3.5°, while an average slant angle of the elongated lens formed surface was 25°.

Three LED's (NSCW215biR by Nichia Corporation) were arranged at intervals of 9.5 mm to confront a short side end face of the light guide of a thickness 1 mm. A silver reflection film was arranged on the elongated lens formed surface of the light guide, and a light deflecting device comprising first and second light deflection sheets was arranged on the rough surface of the light guide. First elongated lenses formed on a light entering surface of the first light deflection sheet were in triangular shapes of apex angles 65°, and arranged in parallel to each other at pitches of 50 µm. Additionally, second elongated lenses in triangular sectional shapes of apex angles 130° were formed in parallel to each other at pitches of 30 µm on a light entering surface of the second light deflection sheet. An average slant angle of the second elongated lens formed surface was 25°. Incidentally, an effective light emission area of the obtained planar light source device was 30.6 mm×40.8 mm.

When luminance of the obtained planar light source device was measured, it was 1610 cd/r². Moreover, when luminance variance was measured in a region of a width 0.5 mm near a light incident end face of the effective light emission region of the planar light source device, a ratio of minimum and maximum values of luminance (minimum value/maximum value) was 0.85, and no luminance variance was visually observed in the effective light emission region.

Example 9

A planar light source device was obtained as in the case of the Example 8 except for use of a light deflecting device in which discontinuously and irregularly arrayed second elongated lenses were formed on a light going-out surface of a second light deflection sheet, and a gap of 50 µm was formed between the second and first light deflection sheets by a spacer. An average slant angle of the second elongated lens formed surface was 25°.

When luminance of the obtained planar light source device was measured, it was 1570 cd/m². Moreover, when luminance variance was measured in a region of a width 0.5 mm near a light incident end face of the effective light emission region of the planar light source device, a ratio of minimum and maximum values of luminance (minimum value/maximum value) was 0.82, and no luminance variance was visually observed in the effective light emission region.

Example 10

A planar light source device was obtained as in the case of the Example 8 except for the fact that a light deflecting device comprising only a first light deflection sheet, and second elongated lenses in triangular sectional shapes of apex angles 130° were formed in parallel to each other at pitches of 30 μm on a light going-out surface of the first light deflection sheet.

When luminance of the obtained planar light source device was measured, it was 1620 cd/m². Moreover, when luminance variance was measured in a region of a width 0.5 mm near a light incident end face of the effective light emission region of the planar light source device, a ratio of minimum and maximum values of luminance (minimum value/maximum value) was 0.80, and no luminance variance was visually observed in the effective light emission region.

INDUSTRIAL APPLICABILITY

As described above, according to the present invention, the plurality of elongated lenses are formed on one of the light emitting face of the light guide and the back surface thereof, and the rough surfaces are disposed on at least a part of the surfaces of the elongated lenses and/or at least a part of the surface on the opposite side to the surface on which the elongated lenses are formed. Thus, it is possible to provide a high-quality planer light source device by preventing, without deteriorating an emitted light distribution, lowering of luminance and non-uniformity in luminance distribution brought about by the use of a small number of primary light sources in a point state to achieve low power consumption of the planar light source device.

What is claimed is:

1. A plate-shaped light guide for a planar light source device that guides a light emitted from a primary light source in a point state, comprising:
   a light incident end face on which the light emitted from the primary light source is incident;
   a light emitting face being disposed perpendicular to the light incident end face and through which the guided light is emitted, and
   a back surface on the opposite to the light emitting face, wherein a plurality of first elongated lenses having an average slant angle of 0.5 to 60° are continuously or intermittently formed on one of the light emitting face and the back surface, and the plurality of first elongated lenses are each an elongated prism having two prism surfaces, and
   at least a portion of the prism surfaces includes a rough surface having an average slant angle of 0.1 to 8°, and at least a portion of the other one of the light emitting face and the back surface includes a rough surface having a slant angle.

2. The light guide for the planar light source device according to claim 1, wherein each of the first elongated lenses extends in a direction substantially orthogonal to a direction of a directivity of the light emitted from the primary light source and entered into the light guide in a plane along the light emitting face.

3. The light guide for the planar light source device according to claim 1, wherein each of the first elongated lenses extends in a direction substantially orthogonal to a propagation direction of the light emitted from the primary light source and entered into the light guide in a plane along the light emitting face.

4. The light guide for the planar light source device according to claim 1, wherein an average slant angle of the first elongated lenses is in a range of 0.5 to 25°.

5. The light guide for the planar light source device according to claim 1, wherein a plurality of second elongated lenses are formed on the other one of the light emitting face and the back surface.

6. The light guide for the planar light source device according to claim 5, wherein the second elongated lenses extend substantially along the direction of the directivity of the light emitted from the primary light source and entered into the light guide in a plane along the light emitting face.

7. The light guide for the planar light source device according to claim 5, wherein the second elongated lenses extend substantially along the propagation direction of the light emitted from the primary light source and entered into the light guide in a plane along the light emitting face.

8. The light guide for the planar light source device according to claim 5, wherein each of the second elongated lenses is an elongated prism or an elongated lenticular lens.

9. The light guide for the planar light source device according to claim 5, wherein the average slant angle of the second elongated lenses is in a range of 8 to 60°.

10. The light guide for the planar light source device according to claim 1, wherein each of the first elongated lenses extends substantially along the direction of the directivity of the light emitted from the primary light source and entered into the light guide in a plane along the light emitting face.

11. The light guide for the planar light source device according to claim 1, wherein each of the first elongated lenses extends substantially along the propagation direction of the light emitted from the primary light source and entered into the light guide in a plane along the light emitting face.

12. The light guide for the planar light source device according to claim 1, wherein the average slant angle of the rough surface is in a range of 0.5 to 6°.

13. The light guide for the planar light source device according to claim 1, wherein each of the first elongated lenses is an elongated prism or an elongated lenticular lens.

14. The light guide for the planar light source device according to claim 1, wherein the average slant angle of the first elongated lenses is in a range of 8 to 60°.

15. A planar light source device comprising:
   the light guide according to claim 1;
   the primary light source arranged adjacently to the light incident end face of the light guide; and
   a light deflecting device arranged adjacently to the light emitting face of the light guide,
   wherein the light deflecting device has a light entering surface positioned so as to confront the light emitting face of the light guide and a light going-out surface on the opposite side to the light entering surface, and a plurality of third elongated lenses are disposed on the light entering surface.

16. The planar light source device according to claim 15, wherein each of the plurality of third elongated lenses of the light deflecting device extends in a direction substantially orthogonal to the direction of the directivity of the light emitted from the primary light source and entered into the light guide in the plane along the light emitting face.

17. The planar light source device according to claim 15, wherein each of the plurality of third elongated lenses of the light deflecting device extends in a direction substantially orthogonal to the propagation direction of the light emitted from the primary light source and entered into the light guide in the plane along the light emitting face.

18. The planar light source device according to claim 15, wherein the primary light source is a light emitting diode (LED) or an aggregate of LED's.

* * * * *